(12) United States Patent
Wang et al.

(10) Patent No.: US 12,192,817 B2
(45) Date of Patent: Jan. 7, 2025

(54) DATA TRANSMISSION METHOD AND APPARATUS, AND SERVICE SWITCHING METHOD AND APPARATUS

(71) Applicant: ZTE CORPORATION, Shenzhen (CN)

(72) Inventors: Mengzhen Wang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 23 days.

(21) Appl. No.: 17/267,437

(22) PCT Filed: Aug. 10, 2019

(86) PCT No.: PCT/CN2019/100110
§ 371 (c)(1),
(2) Date: Feb. 9, 2021

(87) PCT Pub. No.: WO2020/030165
PCT Pub. Date: Feb. 13, 2020

(65) Prior Publication Data
US 2021/0329487 A1 Oct. 21, 2021

(30) Foreign Application Priority Data
Aug. 10, 2018 (CN) .................. 201810912164.X

(51) Int. Cl.
*H04W 28/02* (2009.01)
*H04W 4/40* (2018.01)
(Continued)

(52) U.S. Cl.
CPC ......... *H04W 28/0263* (2013.01); *H04W 4/40* (2018.02); *H04W 28/0257* (2013.01);
(Continued)

(58) Field of Classification Search
None
See application file for complete search history.

(56) References Cited

U.S. PATENT DOCUMENTS

2016/0374128 A1* 12/2016 Fukuta .................. H04W 72/04
2017/0188404 A1* 6/2017 Fodor .................... H04W 76/14
(Continued)

FOREIGN PATENT DOCUMENTS

CN 103037450 A 4/2013
CN 106162930 A 11/2016
(Continued)

OTHER PUBLICATIONS

Huawei et al., "Suport of QoS for PC5-based V2V Transport", 3GPP TSG-RAN WG2 Meeting #94 R2-163811, May 14, 2016 (May 14, 2016), section 2.
(Continued)

*Primary Examiner* — Pamit Kaur
(74) *Attorney, Agent, or Firm* — Morgan, Lewis & Bockius LLP

(57) ABSTRACT

Provided are a data transmission method and apparatus and a traffic switch method and apparatus. The data transmission method includes that a first terminal acquires first information of quality of service (QoS) of a to-be-transmitted data packet on a sidelink, configures a sidelink bearer, and maps, according to the first information, the to-be-transmitted data packet to the sidelink bearer for transmission to a second terminal.

14 Claims, 11 Drawing Sheets a first terminal acquires first information of quality of service (QoS) of a to-be-transmitted data packet on a sidelink — S302 configure a sidelink bearer — S304 map, according to the first information, the to-be-transmitted data packet to the sidelink bearer for transmission to a second terminal — S306

(51) Int. Cl.
*H04W 28/24* (2009.01)
*H04W 92/18* (2009.01)

(52) U.S. Cl.
CPC ....... *H04W 28/0268* (2013.01); *H04W 28/24* (2013.01); *H04W 92/18* (2013.01)

(56) References Cited

U.S. PATENT DOCUMENTS

| | | | |
|---|---|---|---|
| 2018/0124656 A1 | 5/2018 | Park et al. | |
| 2018/0255499 A1* | 9/2018 | Loehr | H04W 76/23 |
| 2019/0097936 A1* | 3/2019 | Yang | H04W 28/0268 |
| 2019/0349951 A1* | 11/2019 | Ahmad | H04W 76/14 |
| 2020/0045579 A1* | 2/2020 | Xu | H04L 1/0025 |
| 2020/0112873 A1* | 4/2020 | Zhu | H04W 28/0268 |
| 2020/0389900 A1* | 12/2020 | Lee | H04W 72/0493 |

FOREIGN PATENT DOCUMENTS

| | | | |
|---|---|---|---|
| CN | 106341839 A | 1/2017 | |
| CN | 106470384 A | 3/2017 | |
| CN | 106658424 A | 5/2017 | |
| CN | 107018162 A | 8/2017 | |
| CN | 107580340 A | 1/2018 | |
| WO | WO-2015163625 A1 | 10/2015 | |
| WO | WO-2016054577 A2 * | 4/2016 | H04L 43/028 |
| WO | WO-2017146710 A1 | 8/2017 | |
| WO | WO2017173579 A1 | 10/2017 | |
| WO | WO-2021022687 A1 * | 2/2021 | |

OTHER PUBLICATIONS

International Search Report for Application No. PCT/CN2019/100110, dated Oct. 23, 2019, 6 pages including English translation.
Extended European Search Report for Application No. 19846735.9, dated Mar. 25, 2022, 19 pages.
Huawei et al., "Support of QoS for PC5-based V2X transport", 3GPP TSG-RAN WG2 Meeting #95, R2-164917, 3GPP Draft, R2-164917, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 22, 2016-Aug. 26, 2016 Aug. 21, 2016 (Aug. 21, 2016), XP051126591, Retrieved from the Internet: URL:http://www.3gpp.org/ftp/Meetings_3GPP_SYNC/RAN2/Docs/[retrieved on Aug. 21, 2016] pp. 2 and 3, section 2.1.
Huawei et al., "Views on 5G V2X work in Rel-16", 3GPP TSG RAN#80, RP-180890, 3GPP Draft, RP-180890 NR-V2X, 3rd Generation Partnership Project (3GPP), Mobile Competence Centre, 650, Route Des Lucioles, F-06921 Sophia-Antipolis Cedex, France, vol. TSG RAN, No. La Jolla, USA, Jun. 11, 2018-Jun. 14, 2018 Jun. 4, 2018 (Jun. 4, 2018), XP051510792, Retrieved from the Internet: URL:http://www.3gpp.org/ftp/tsg%5Fran/TSG%5FRAN/TSGR%5F80/Docs/RP%2D180890%2Ezip [retrieved on Jun. 4, 2018] "QoS Framework", p. 7.
Huawei, "Interface Switching between Uu and PC5", 3GPP TSG-RAN3 Meeting #92, R3-161172, 3GPP Draft, R3-161172 Interface Switching Between Uu and PC5, 3rd Generation Partnership Project (3GPP), Mobile Competence Centre, 650, Route Des Lucioles, F-06921 Sophia-Antipolis Cedex, France, vol. RAN WG3, No. Nanjing, China, May 23, 2016-May 27, 2016 May 22, 2016 (May 22, 2016), XP051105976, Retrieved from the Internet: URL:http://www.3gpp.org/ftp/Meetings_3GPP_SYNC/RAN3/Docs/[retrieved on May 22, 2016] pp. 1, 2, paragraph 2.1 and 2.2 p. 3, paragraph 2.4.1. and 2.4.2.
Xinwei, "QoS control in sidelink communications", 3GPP TSG RAN WG2 Meeting #91, R2-153575, 3GPP Draft, R2-153575_QoS Control in Sidelink Communications, 3rd Generation Partnership Project (3GPP), Mobile Competence Centre, 650, Route Des Lucioles, F-06921 Sophia-Antipolis Cedex, France, vol. RAN WG2, No. Beijing, China, Aug. 24, 2015-Aug. 28, 2015 Aug. 23, 2015 (Aug. 23, 2015), XP051040225, Retrieved from the Internet: URL:http://www.3gpp.org/ftp/Meetings_3GPP_SYNC/RAN2/Docs/[retrieved on Aug. 23, 2015] p. 1, last line p. 2, figure 2.
Zte, "QoS handling for PC5-based V2V transmission", 3GPP TSG-RAN WG2 Meeting #94, R2-163819, 3GPP Draft, R2-163819_QoS Handling for PC5-BASED V2V Transmission, 3rd Generation Partnership Project (3GPP), Mobile Competence Centre, 650, Route Des Lucioles, F-06921 Sophia-Antipolis Cedex, France, vol. RAN WG2, No. Nanjing, China, May 23, 2016-May 27, 2016 May 22, 2016 (May 22, 2016), XP051105225, Retrieved from the Internet: URL:http://www.3gpp.org/ftp/Meetings_3GPP_SYNC/RAN2/Docs/ [retrieved on May 22, 2016] p. 2, lines 28-35, p. 3, figure 3.
Korean Office Action for Application No. 10-2021-7007349, dated Dec. 26, 2023, 15 pages including English translation.
Huawei, "Interface Switching between Uu and PC5", 3 GPP TSG-RAN3 Meeting #92, R3-161172, Nanjing, China, May 23-27, 2016.
LG Electronics, "TS 23.502: PDU session modification with QoS update", SA WG2 Meeting #120, S2-172082, Busan, South Korea, Mar. 21-31, 2017.
Qualcomm Incorporated et al., "eV2X QoS Support of PC5 communications", SA WG2 Meeting #128, S2-186990, Vilnius, Lithuania, Jul. 2-6, 2018.
Xinwei, "QoS control in sidelink communications", 3GPP TSG RAN WG2 Meeting #91, R2-153575, Beijing, China, Aug. 24-28, 2015.
ZTE, "QoS handling of PC5-based V2V transmission", 3GPP TSG-RAN WB2 Meeting #94, R2-163819, Nanjing, China, May 23-27, 2016.
Examination Report for European Application No. 19846735.9, dated Nov. 23, 2023, 11 pages.
Office Action for Chinese Application No. 201810912164.X, dated Oct. 12, 2023, 15 pages including translation.
Search Report for Chinese Application No. 201810912164.X dated Oct. 9, 2023, 7 pages including translation.
LG Electronics: "SA WG2 Meeting #120; S2-172082; TS 23.502: PDU session modification with QoS update", 3GPP Draft; S2-172082_TS 23 502 PDU Session Modification With QoS Update Procedure, 3rd Generation Partnership Project (3GPP), Mobile Competence Centre ; 650, Route Des Lucioles ; F-06921 Sophia Antipolis, vol. SA WG2, No. Busan, South Korea; Mar. 27, 2017-Mar. 31, 2017 Mar. 21, 2017 (Mar. 21, 2017), XP051257651, Retrieved from the Internet: URL:http://www.3gpp.org/ftp/tsg_sa/WG2_Arch/TSGS2_120_Busan/Docs/ [retrieved on Mar. 21, 2017].
Huawei et al., " QoS architecture for PC5 based V2X messages", 3GPP, SA WG2 Meeting #114, S2-161648, Apr. 11-15, 2016, Sophia Antipolis, France.
Beijing Xinwei Telecom Techn., "QoS control in sidelink communications", 3GPP TSG RAN WG2 Meeting #91, R2-153575, Aug. 24-28, 2015, Beijing, China.

* cited by examiner

DATA TRANSMISSION METHOD AND APPARATUS, AND SERVICE SWITCHING METHOD AND APPARATUS

This is a U.S. National Stage Application, filed under 35 U.S.C. 371, of International Patent Application No. PCT/CN2019/100110, filed on Aug. 10, 2019, which claims priority to Chinese Patent Application No. 201810912164.X, filed on Aug. 10, 2018, the contents of which are incorporated herein by reference in their entireties.

This application claims priority to Chinese Patent Application No. 201810912164.X filed Aug. 10, 2018, the disclosure of which is incorporated herein by reference in its entirety.

TECHNICAL FIELD

The present application relates to the field of communication, for example, to a data transmission method and apparatus and a traffic switch method and apparatus.

BACKGROUND

In the related art, vehicle to everything refers to a large system network for wireless communication and information exchange between a vehicle and X (X: a vehicle, a pedestrian, an infrastructure, the Internet, or the like) in accordance with an agreed communication protocol and a data interaction standard. The vehicle-to-everything communication ensures the driving safety of the vehicle, improves the transport efficiency, and provides the vehicle with convenience or entertainment information. According to the objects involved in wireless communication, the vehicle-to-everything communication includes three different types: vehicle-to-vehicle (V2V) communication, vehicle-to-infrastructure/vehicle-to-network (V2I/V2N) communication, and vehicle-to-pedestrian (V2P) communication. These three types are collectively referred to as V2X communication. FIG. 1 is a schematic diagram of a V2X sidelink traffic scenario in the related art. FIG. 1 shows a base station, UE1, UE2, and UE3, and sidelink traffic transmission is performed among the three terminals.

In the research of V2X communication based on long term evolution (LTE) organized by the 3rd Generation Partnership Project (3GPP), the V2X communication method based on a sidelink between user equipments (UEs) is one way of implementing V2X standards. That is, traffic data is directly transmitted from a source user equipment to a target user equipment via an air interface without being forwarded by a base station and a core network. Such V2X communication method, as shown in FIG. 1, is simply referred to as PC5-based V2X communication or V2X sidelink communication.

With the development of technologies and automation industries, a V2X communication scenario is further extended and has higher performance requirements. Advanced V2X traffic is mainly divided into four categories: vehicle platooning, extended sensors, advanced driving (semi-automated or full-automated driving), and remote driving. Performance requirements to be met are as follows: a packet size supporting 50 bytes to 12000 bytes, a transmission rate of 2 messages to 50 messages per second, a maximum end-to-end delay of 3 ms to 500 ms, a reliability of 90% to 99.999%, a data rate of 0.5 Mbps to 1000 Mbps, and a transmission range supporting 50 m to 1000 m. 3GPP has approved the research of vehicle-to-everything communication based on 5th Generation (5G) including vehicle-to-everything communication based on a 5G air interface and vehicle-to-everything communication based on a 5G sidelink.

No effective solution has been proposed to solve the problem in the related art of lacking solutions of determining sidelink service quality assurance and a bearer suitable for the new radio.

SUMMARY

A data transmission method and apparatus and a traffic switch method and apparatus are provided in the embodiments of the present application to solve at least the problem in the related art of lacking solutions of determining sidelink service quality assurance and a bearer suitable for the new radio.

A data transmission method is provided according to an embodiment of the present application. The method includes: a first terminal acquiring first information of quality of service (QoS) of a to-be-transmitted data packet on a sidelink; configuring a sidelink bearer; and mapping, according to the first information, the to-be-transmitted data packet to the sidelink bearer for transmission to a second terminal.

A traffic switch method is further provided according to another embodiment of the present application. The method includes: a first terminal acquiring traffic switch information; and performing traffic switch according to the traffic switch information, where the traffic switch is configured for switching a to-be-transmitted data packet between a Uu interface and a PC5 interface.

A data transmission apparatus is further provided according to another embodiment of the present application. The apparatus includes: a first acquisition module configured to acquire first information of quality of service (QoS) of a to-be-transmitted data packet on a sidelink, a first configuration module configured to configure a sidelink bearer, and a first mapping module configured to map, according to the first information, the to-be-transmitted data packet to the sidelink bearer for transmission to a second terminal.

A traffic switch apparatus is further provided according to another embodiment of the present application. The apparatus includes: a second acquisition module configured to enable a first terminal to acquire traffic switch information and a second switch module configured to perform traffic switch according to the traffic switch information, where the traffic switch is configured for switching a to-be-transmitted data packet between a Uu interface and a PC5 interface.

A storage medium is further provided according to another embodiment of the present application. The storage medium stores a computer program. The computer program is configured to, when executed, perform the steps of any one of the foregoing method embodiments.

An electronic apparatus is further provided according to another embodiment of the present application, and includes a memory and a processor. The memory stores a computer program and the processor is configured to execute the computer program to perform the steps of any one of the foregoing method embodiments.

According to the present application, the first terminal acquires the first information of the quality of service (QoS) of the to-be-transmitted data packet on the sidelink, configures the sidelink bearer, and maps, according to the first information, the to-be-transmitted data packet to the sidelink bearer for transmission to the second terminal. With the foregoing solutions, sidelink traffic transmission is performed according to the first information related to QoS. Solutions of sidelink quality of service assurance and bearer configuration and mapping suitable for the new radio are provided, solving the problems in the related art of lacking solutions of sidelink quality of service assurance and determination of a sidelink bearer suitable for the new radio.

BRIEF DESCRIPTION OF DRAWINGS

The drawings described herein are used to provide a further understanding of the present application and form a part of the present application. The examplary embodiments and descriptions thereof in the present application are used to explain the present application and not to limit the present application in any improper way. In the drawings.

DETAILED DESCRIPTION

It is to be noted that the terms such as "first" and "second" in the description, claims and drawings of the present application are used to distinguish between similar objects and are not necessarily used to describe a particular order or sequence.

Embodiment One

Embodiments of the present application provide a mobile communication network (including a 5G mobile communication network). A network side device (such as a base station) and a terminal may be included in the network architecture of the network. This embodiment provides an information transmission method executable on the foregoing network architecture. It is to be noted that an execution environment of the foregoing information transmission method provided by this embodiment of the present application is not limited to the foregoing network architecture.

Figure 1:
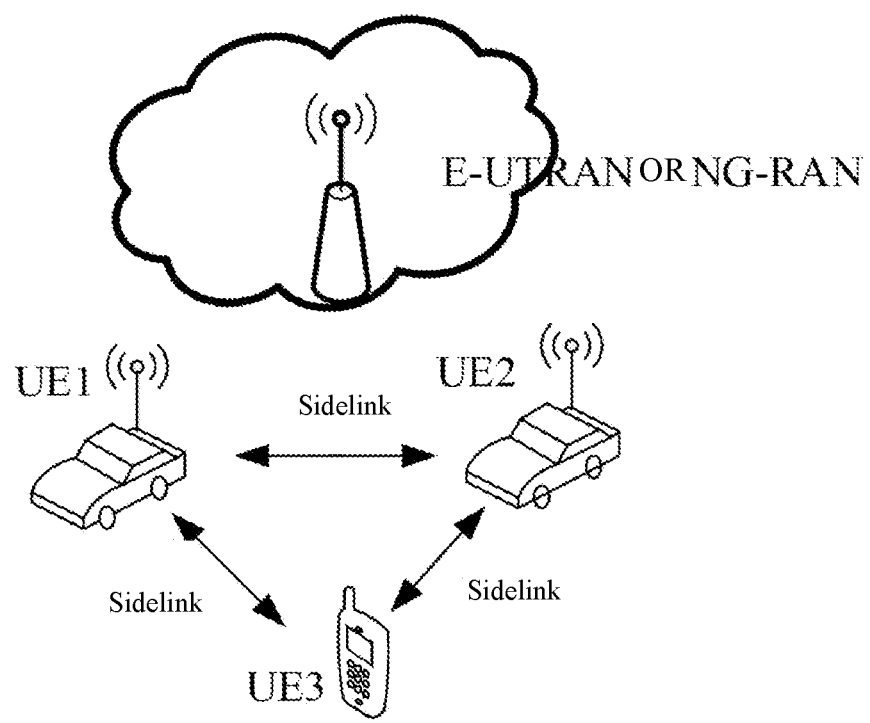
FIG. 1 is a schematic diagram of a V2X sidelink traffic scenario in the related art.
Figure 2:
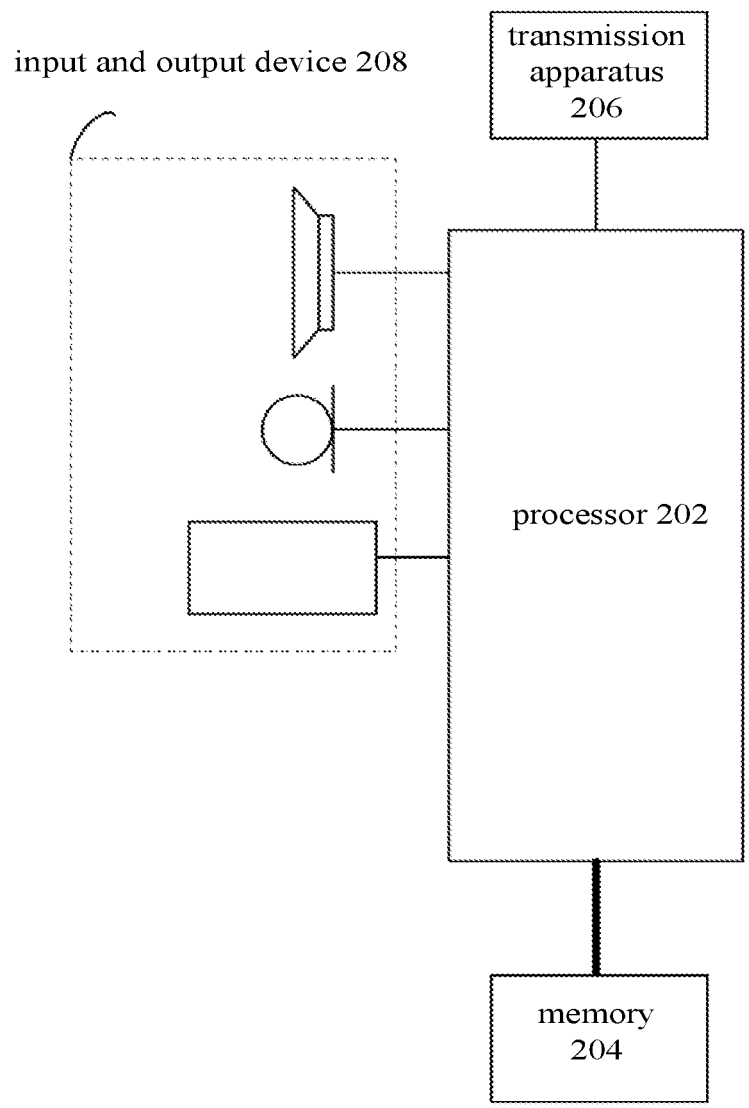
FIG. 2 is a block diagram of hardware of a mobile terminal for a data transmission method according to an embodiment of the present application.

The method embodiment provided in embodiment one of the present application may be performed in a mobile terminal, a computer terminal or other similar computing apparatuses. For example, the method is executed in the mobile terminal. FIG. 2 is a block diagram of hardware of a mobile terminal for a data transmission method according to an embodiment of the present application. As shown in FIG. 2, a mobile terminal 20 may include one or more (merely one is shown in FIG. 2) processors 202 (the processor 202 may include a processing apparatus such as a microcontroller unit (MCU) and a field-programmable gate array (FPGA)), and a memory 204 configured to store data. In some embodiments, the foregoing mobile terminal may further include a transmission apparatus 206 configured to implement a communication function and an input and output device 208. It is to be understood by those of ordinary skill in the art that the structure shown in FIG. 2 is merely illustrative and not intended to limit the structure of the foregoing mobile terminal. For example, the mobile terminal 20 may further include more or fewer components than the components shown in FIG. 2, or may have a configuration different from the configuration shown in FIG. 2.

The memory 204 may be configured to store software programs and modules of application software, such as program instructions/modules corresponding to the data transmission method in the embodiments of the present application. The one or more processors 202 execute the software programs and modules stored in the memory 204 to perform multiple functional applications and data processing, that is, to implement the foregoing method. The memory 204 may include a high-speed random access memory, and may further include a nonvolatile memory such as one or more magnetic storage apparatuses, flash memories, or other nonvolatile solid-state memories. In some examples, the memory 204 may further include memories that are remotely disposed with respect to the one or processors 202. These remote memories may be connected to the mobile terminal 20 via a network. The examples of the foregoing network include, but are not limited to, the Internet, an intranet, a local area network, a mobile communication network, and a combination thereof.

The transmission apparatus 206 is configured to receive or send data via a network. Examples of such a network may include a wireless network provided by a communication provider of the mobile terminal 20. In one example, the transmission apparatus 206 includes a network interface controller (NIC) and may be connected to other network equipment via a base station and thus be capable of communicating with the Internet. In one example, the transmission apparatus 206 may be a radio frequency (RF) module and is configured to communicate with the Internet in a wireless manner.

Figure 3:
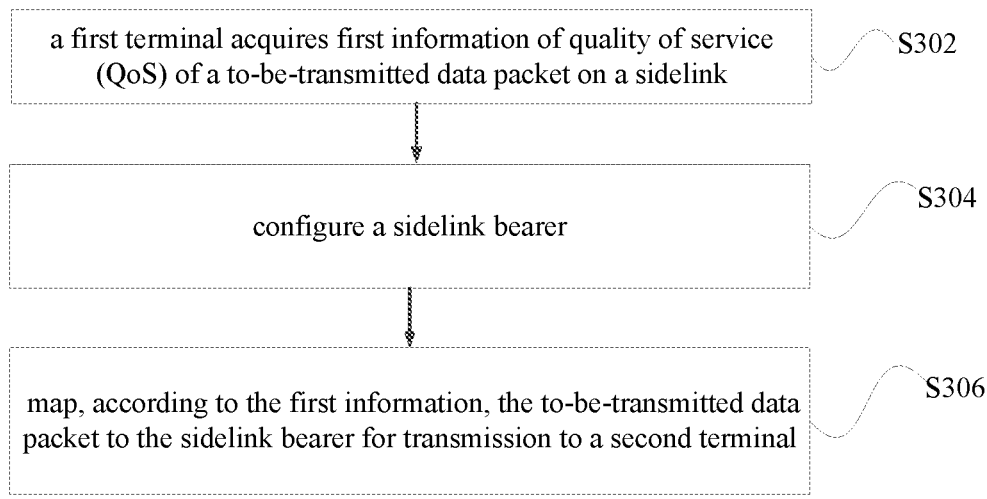
FIG. 3 is a flowchart of a data transmission method according to an embodiment of the present application.

This embodiment provides a data transmission method executed in the foregoing mobile terminal. FIG. 3 is a flowchart of a data transmission method according to an embodiment of the present application. As shown in FIG. 3, the method includes the steps described below.

In step S302, a first terminal acquires first information of quality of service (QoS) of a to-be-transmitted data packet on a sidelink.

In step S304, a sidelink bearer is configured.

In step S306, the to-be-transmitted data packet is mapped to the sidelink bearer according to the first information for transmission to a second terminal.

The to-be-transmitted data packet may be a sidelink data packet.

According to the foregoing steps, the first terminal acquires the first information of the quality of service (QoS) of the to-be-transmitted data packet on the sidelink, configures the sidelink bearer, and maps, according to the first information, the to-be-transmitted data packet to the sidelink bearer for transmission to the second terminal. With the foregoing solution, sidelink traffic transmission is performed according to the first information related to QoS. A solution of sidelink bearer mapping suitable for the new radio is provided, solving the problem in the related art of lacking a solution of determining a sidelink bearer suitable for the new radio.

The technical solution regarding the sidelink bearer in the present application may be applied to a logical channel.

In some embodiments, the foregoing steps may be executed by a mobile terminal such as a vehicle.

In some embodiments, the first information includes at least one of: second information including a fifth-generation mobile system quality of service identifier (5QI) and/or a transmission range corresponding to the to-be-transmitted data packet; third information including at least one of the following information corresponding to the to-be-transmitted data packet: a priority, reliability, a transmission delay, a data rate, a packet error rate, or a transmission range; fourth information including sidelink QoS rules; or fifth information including a sidelink QoS profile.

In some embodiments, when the first information is the second information or the third information, the step in which the first terminal acquires the first information of the quality of service (QoS) on the sidelink includes that the first terminal acquires the second information or the third information from a V2X application layer. V2X may be a data transmission between a vehicle and X and includes vehicle-to-vehicle communication, vehicle-to-pedestrian communication, vehicle-to-infrastructure communication, and the like.

In some embodiments, when the first information is the fourth information and/or the fifth information, the step in which the first terminal acquires the first information of the quality of service (QoS) on the sidelink includes one of the following: the first terminal acquires the fourth information and/or the fifth information from a V2X control function entity; the first terminal acquires the fourth information and/or the fifth information from preconfigured information; or the first terminal acquires the fourth information from an access and mobility management function entity at the network side.

The fourth information includes at least one of: a 5QI, a guaranteed flow bit rate (GFBR), a maximum flow bit rate (MFBR), or an averaging window.

In some embodiments, the sidelink QoS rules are the same as or different from the Uu (user equipment) QoS rules of the first terminal.

In some embodiments, the step of configuring the sidelink bearer includes one of the following: the first terminal independently configures the sidelink bearer according to the fourth information and/or the fifth information; or the first terminal sends sidelink bearer configuration information to the second terminal, receives sidelink bearer configuration response information fed back by the second terminal, and configures the sidelink bearer according to the sidelink bearer configuration response information.

In some embodiments, the sidelink bearer configuration information includes at least one of: a bearer identifier, a service data adaptation protocol (SDAP) configuration, a packet data convergence protocol (PDCP) configuration, a radio link control (RLC) configuration, a logical channel configuration, a mirror QoS indication, or a QoS parameter. The QoS parameter includes multiple information: the 5QI, the GFBR, the MFBR, and the averaging window.

In some embodiments, the method satisfies at least one of the features described below.

The SDAP configuration includes at least one of: NULL, a default bearer indication, a list of QoS flows mapped to the bearer, or whether an SDAP subheader is included.

The PDCP configuration includes at least one of: a packet discarding timer, a length of a PDCP sequence number, header compression, or a reordering timer.

The RLC configuration includes at least one of: a non-acknowledgement mode or an acknowledgement mode, a polling-related configuration in an acknowledgement mode, a maximum number of retransmissions in an acknowledgement mode, or whether out-of-order delivery is supported.

The logical channel configuration includes at least one of: a logical channel identifier, a logical channel priority, a prioritized guaranteed bit rate, bucket size duration, subcarrier spacing, an associated sidelink bandwidth part (BWP) index, or an associated carrier indication.

The QoS parameter includes at least one of: a 5QI, an allocation retention priority, a UE-PC5-aggregate maximum bit rate (AMBR), a PC5 guaranteed flow bit rate (GFBR), a PC5 maximum flow bit rate (MFBR), a PC5 mirror QoS indication, a priority, a packet delay, a packet error rate, reliability, or a resource type.

In some embodiments, the sidelink bearer configuration response information includes at least one of: a list of sidelink bearers supported by the second terminal or a list of sidelink bearers not supported by the second terminal. The reason why the sidelink bearers are not supported by the second terminal may also be included.

In some embodiments, the step of configuring the sidelink bearer includes that: the first terminal receives sidelink bearer configuration information sent by a base station; and the sidelink bearer is configured according to the sidelink bearer configuration information.

In some embodiments, the step of mapping, according to the first information, the to-be-transmitted data packet to the sidelink bearer for the transmission includes one of the following: in response to the first information being the second information, mapping a to-be-transmitted data packet associated with a first 5QI to a sidelink bearer associated with the first 5QI for the transmission; or in response to the first information being the fourth information, mapping, according to the sidelink rules and the sidelink bearer configuration information, the to-be-transmitted data packet to a corresponding sidelink bearer for the transmission.

In some embodiments, the step of mapping, according to the sidelink rules, the to-be-transmitted data packet to the corresponding sidelink bearer for the transmission includes that: the first terminal maps the to-be-transmitted data packet to a QoS flow according to the sidelink rules; and a sidelink SDAP entity of the first terminal maps the QoS flow to the sidelink bearer for the transmission.

In some embodiments, the method includes that: in the first terminal, the sidelink SDAP entity is the same as or different from a Uu SDAP entity.

In some embodiments, the step in which the sidelink SDAP entity of the first terminal maps the QoS flow to the sidelink bearer for the transmission includes the cases described below.

In a case where SDAP configuration information in the sidelink bearer configuration information indicates NULL or a list of QoS flows mapped to the sidelink bearer is empty, the first terminal determines a rule of mapping between the QoS flow and the sidelink bearer.

In a case where the SDAP configuration information in the sidelink bearer configuration information indicates that the list of QoS flows mapped to the sidelink bearer is non-empty, the first terminal maps, according to a mapping relationship of the non-empty list, the QoS flow to the sidelink bearer for the transmission.

In a case where the SDAP configuration information in the sidelink bearer configuration information indicates that the list of QoS flows mapped to the sidelink bearer is non-empty and an indication of supporting mirror QoS exists, the SDAP entity of the first terminal marks a QoS flow identifier (QFI) corresponding to a data packet of the QoS flow.

In some embodiments, the QFI and the QoS flow are configured for providing a basis for a peer UE to update a first mapping relationship which is a mapping relationship between a QFI and a sidelink bearer stored by the peer UE.

In some embodiments, after mapping, according to the first information, the to-be-transmitted data packet to the sidelink bearer for the transmission to the second terminal, the method further includes: the first terminal acquiring traffic switch information; and performing traffic switch according to the traffic switch information, where the traffic switch is configured for switching the to-be-transmitted data packet between a Uu interface and a PC5 interface.

In some embodiments, the traffic switch information includes at least one of: application layer information, access layer information, or traffic switch indication information configured by a base station.

In some embodiments, the method satisfies at least one of the features described below.

The application layer information includes at least one of: a data packet traffic type, a QoS flow traffic type, or QoS demand information. The QoS demand information includes at least one of: a priority, a delay, reliability, a transmission rate, a data rate, or a transmission range.

The access layer information includes at least one of: Uu link quality, Uu reference signal received power, a Uu bearer and QoS parameter, a Uu congestion degree, PC5 link quality, a PC5 connection establishment state, a PC5 channel busy-idle rate, a PC5 discovery signal received power, a PC5 synchronization signal received power, a PC5 resource conflict probability, a PC5 congestion situation, a PC5 bearer, or a QoS parameter.

The traffic switch indication information configured by the base station includes at least one of: a traffic switch indication, a Uu link quality threshold, a PC5 link quality threshold, a delay threshold, a reliability threshold, a data rate threshold, a traffic type, an application type, a QoS flow identifier (QFI) of a switched PC5 QoS flow, a mapping relationship between a switched PC5 QoS flow and a data radio bearer (DRB), information about a switched Uu QoS flow, or a mapping relationship between a switched Uu QoS flow and a sidelink bearer.

In some embodiments, information about a Uu QoS flow includes a PDU session identifier and a QFI.

In some embodiments, the step of performing the traffic switch according to the traffic switch information includes one of the steps described below.

In a case where an application layer of the first terminal determines that a fourth data packet is transmitted via the Uu interface, the first terminal maps the fourth data packet to a fourth QoS flow through Uu QoS rules, and an SDAP entity of the first terminal maps the fourth QoS flow to a DRB for transmission.

In a case where an application layer of the first terminal determines that a fifth data packet is transmitted via the PC5 interface, the application layer of the first terminal configures a fifth 5QI corresponding to the fifth data packet, and the first terminal maps the fifth data packet to a sidelink bearer associated with the fifth 5QI.

The first terminal switches and maps a QoS flow of a fourth QFI transmitted via the Uu interface to a sidelink bearer associated with a same 5QI or the fourth QFI in the PC5 interface.

The first terminal acquires a sixth data packet associated with a sixth 5QI at the PC5 interface and maps the sixth data packet to a sixth QoS flow of the sixth 5QI in the Uu interface or to a newly established seventh QoS flow; and an SDAP entity of the first terminal maps the sixth QoS flow or the seventh QoS flow to a DRB.

In a case where the first terminal determines, according to the traffic switch information, that a seventh data packet is transmitted at the PC5 interface, the first terminal maps the seventh data packet to a PC5 QoS flow through PC5 QoS rules, and an SDAP entity of the first terminal maps the PC5 QoS flow to a sidelink bearer for transmission.

After the first terminal maps a data packet to an eighth QoS flow according to QoS rules, in response to determining that the eighth QoS flow is transmitted via the Uu interface, eighth information of a transmission path is indicated to an SDAP entity of the first terminal, and the SDAP entity of the first terminal maps, according to the eighth information, the eighth QoS flow to a DRB for transmission.

After the first terminal maps a data packet to a ninth QoS flow according to QoS rules, in response to determining that the ninth QoS flow is transmitted via the PC5 interface, ninth information of a transmission path is indicated to an SDAP entity of the first terminal, and the SDAP entity of the first terminal maps, according to the ninth information, the ninth QoS flow to a sidelink bearer for transmission.

In some embodiments, after performing the traffic switch according to the traffic switch information, the method further includes at least one of the following: the first terminal sends first notification information to a base station, and the base station updates the mapping relationship between a DRB and a QFI according to the first notification information; or the first terminal sends a second notification message to the second terminal, where the second terminal updates a mapping relationship between a sidelink bearer and a QFI or releases a PC5 connection with the first terminal according to the second notification message.

A traffic switch method is further provided according to another embodiment of the present application. The method includes steps described below.

In step 110, a first terminal acquires traffic switch information.

In step 210, traffic switch is performed according to the traffic switch information, where the traffic switch is configured for switching a to-be-transmitted data packet between a Uu interface and a PC5 interface.

With the foregoing solution, the first terminal acquires the traffic switch information and the switch is performed according to the traffic switch information. A manner of traffic switch between the Uu interface and the PC5 interface suitable for the new radio is provided, solving the problem in the related art of lacking a solution of traffic switch between the Uu interface and the PC5 interface suitable for the new radio.

In some embodiments, the traffic switch information includes at least one of: application layer information, access layer information, or traffic switch indication information configured by a base station.

In some embodiments, the method satisfies at least one of the features described below.

The application layer information includes at least one of: a data packet traffic type, a QoS flow traffic type, or QoS demand information. The QoS demand information includes at least one of: a priority, a delay, reliability, a transmission rate, a data rate, or a transmission range.

The access layer information includes at least one of: Uu link quality, Uu reference signal received power, a Uu bearer and QoS parameter, a Uu congestion degree, PC5 link quality, a PC5 connection establishment state, a PC5 channel busy-idle rate, a PC5 discovery signal received power, a PC5 synchronization signal received power, a PC5 resource conflict probability, a PC5 congestion situation, a PC5 bearer, or a QoS parameter.

The traffic switch indication information configured by the base station includes at least one of: a traffic switch indication, a Uu link quality threshold, a PC5 link quality threshold, a delay threshold, a reliability threshold, a data rate threshold, a traffic type, an application type, a QoS flow identifier (QFI) of a switched PC5 QoS flow, a mapping relationship between a switched PC5 QoS flow and a DRB, information about a switched Uu QoS flow, or a mapping relationship between a switched Uu QoS flow and a sidelink bearer.

Information about a Uu QoS flow includes a PDU session identifier and a QFI.

In some embodiments, the step of performing the traffic switch according to the traffic switch information includes one of the steps described below.

The first terminal independently decides, according to the traffic switch information, to perform the traffic switch.

The first terminal acquires traffic switch indication information sent by the base station, and performs the traffic switch according to the traffic switch indication information.

In some embodiments, the step of performing the traffic switch according to the traffic switch information includes one of the steps described below.

Traffic switch for each data packet is performed according to the traffic switch information.

Traffic switch for each QoS flow is performed according to the traffic switch information.

In some embodiments, the step of performing the traffic switch according to the traffic switch information includes one of the steps described below.

In a case where an application layer of the first terminal determines that a fourth data packet is transmitted via the Uu interface, the first terminal maps the fourth data packet to a fourth QoS flow through Uu QoS rules, and an SDAP entity of the first terminal maps the fourth QoS flow to a DRB for transmission.

In a case where an application layer of the first terminal determines that a fifth data packet is transmitted via the PC5 interface, the application layer of the first terminal configures a fifth 5QI corresponding to the fifth data packet, and the first terminal maps the fifth data packet to a sidelink bearer associated with the fifth 5QI.

The first terminal switches and maps a QoS flow of a fourth QFI transmitted via the Uu interface to a sidelink bearer associated with a same 5QI or the fourth QFI in the PC5 interface.

The first terminal acquires a sixth data packet associated with a sixth 5QI at the PC5 interface and maps the sixth data packet to a sixth QoS flow of the sixth 5QI in the Uu interface or to a newly established seventh QoS flow; and an SDAP entity of the first terminal maps the sixth QoS flow or the seventh QoS flow to a DRB.

In a case where the first terminal determines, according to the traffic switch information, that a seventh data packet is transmitted at the PC5 interface, the first terminal maps the seventh data packet to a PC5 QoS flow through PC5 QoS rules, and an SDAP entity of the first terminal maps the PC5 QoS flow to a sidelink bearer for transmission.

After the first terminal maps a data packet to an eighth QoS flow according to QoS rules, in response to determining that the eighth QoS flow is transmitted via the Uu interface, eighth information of a transmission path is indicated to an SDAP entity of the first terminal, and the SDAP entity of the first terminal maps, according to the eighth information, the eighth QoS flow to a DRB for transmission.

After the first terminal maps a data packet to a ninth QoS flow according to QoS rules, in response to determining that the ninth QoS flow is transmitted via the PC5 interface, ninth information of a transmission path is indicated to an SDAP entity of the first terminal, and the SDAP entity of the first terminal maps, according to the ninth information, the ninth QoS flow to a sidelink bearer for transmission.

In some embodiments, when the first terminal determines, according to the traffic switch information, to transmit data at the Uu interface, the to-be-transmitted data packet is mapped to a QoS flow according to QoS rules, and the SDAP entity of the first terminal maps the QoS flow to a data radio bearer (DRB) for transmission.

In some embodiments, the step in which the SDAP entity of the first terminal maps the sixth QoS flow, the seventh QoS flow, or the eighth QoS flow to the DRB includes one of the steps described below.

The SDAP entity of the first terminal maps, according to a mapping relationship between a QoS flow and a DRB in a sidelink bearer configuration, the sixth QoS flow, the seventh QoS flow, or the eighth QoS flow to the DRB for transmission.

In response to not configuring a mapping relationship between a QoS flow and a DRB, the SDAP entity of the first terminal maps the sixth QoS flow, the seventh QoS flow, or the eighth QoS flow to a default DRB for transmission.

In response to not configuring a mapping relationship between a QoS flow and a DRB, the first terminal initiates a session request to establish a new session and configures the mapping relationship between the QoS flow and the DRB, or the first terminal initiates a session request to modify a current session and configures the mapping relationship between the QoS flow and the DRB.

In some embodiments, before the SDAP entity of the first terminal maps the PC5 QoS flow to the sidelink bearer for the transmission, the method further includes that the first terminal acquires a second mapping relationship between the PC5 QoS flow and the sidelink bearer in one of the manners described below.

The first terminal independently determines the second mapping relationship.

The second mapping relationship configured by a base station is received.

The first terminal and a peer terminal determine the second mapping relationship through negotiation.

Mirror mapping is performed according to a third mapping relationship between a sidelink bearer and a PC5 QoS flow of a peer terminal to acquire the second mapping relationship.

In some embodiments, after performing the traffic switch according to the traffic switch information, the method further includes at least one of the following steps:

the first terminal sends first notification information to a base station for indicating that a tenth QoS flow transmitted at the Uu interface is switched to the PC5 interface, and the base station updates a mapping relationship between a DRB and a QFI according to the first notification information, that is, the first notification information may indicate which QoS flows in the Uu interface have been switched; and the base station configures the sidelink bearer for the first terminal according to the QoS parameter of the QoS flow in the indicated first notification information; or the first terminal sends a second notification message to the second terminal, where the second terminal updates a mapping relationship between a sidelink bearer and a QFI or releases a PC5 connection with the first terminal according to the second notification message.

In some embodiments, the first notification message is used to indicate that the tenth QoS flow transmitted at the Uu interface is switched to the PC5 interface.

In some embodiments, after the first terminal sends the first notification information to the base station, the first terminal receives the sidelink bearer configuration configured by the base station for the first terminal according to the QoS parameter of the tenth QoS flow.

The embodiments of the present application are described below.

Embodiment 1: 5QI-based QoS Mechanism

Scheme 1: A V2X application layer associates a V2X packet to a corresponding 5QI. The V2X application layer carries the 5QI corresponding to the V2X packet when transmitting the V2X packet to an access (AS) layer. Each SL logical channel (LCH) is associated with one or more 5QIs (the mapping relationship between an SL LCH and a 5QI is implemented by the UE or configured by the eNB). The UE maps, according to the 5QI associated with the V2X packet, the packet to the SL LCH associated with the same 5QI.

The 5QI may be standardized, pre-configured, or dynamically allocated. Each 5QI includes at least one of: a priority, a delay, a packet error rate, a resource type, or an averaging window. In addition, the V2X application layer may also carry the required transmission range when transmitting the V2X packet to the AS layer.

In another scheme 2 of embodiment 1, in the R14 V2X SL, when an upper layer sends a V2X data packet to the AS layer, the Prose Per Packet Priority (PPPP) of the V2X data packet (which may derive a packet delay budget (PDB)) and ProSe per packet reliability (PPPR) are carried. Each SL LCH is associated with one priority, and the UE maps the data packet to the SL LCH having the same priority for transmission. After obtaining the delay according to the priority, the UE AS tells the delay requirement to a physical layer, and the physical layer considers the delay when selecting resources.

It may be considered that on the basis of the R14 mechanism, not only the PPPP and the PPPR but also a data transmission rate and a transmission range are carried when the V2X application layer transmits the V2X data packet to the AS layer.

In scheme 1 with respect to scheme 2, the V2X application layer merely needs to provide one 5QI value instead of a set of parameters, reducing overhead.

Embodiment 2: QoS Flow-Based QoS Mechanism

The UE is pre-configured with sidelink QoS rules or obtains sidelink QoS rules from a V2X control function, the sidelink QoS rules being configured for mapping V2X packets to sidelink QoS flows. The UE is pre-configured with sidelink QoS profiles or obtains sidelink QoS profiles from the V2X control function, the sidelink QoS profiles being used as reference to establish a sidelink radio bearer (SL RB).

Figure 4:
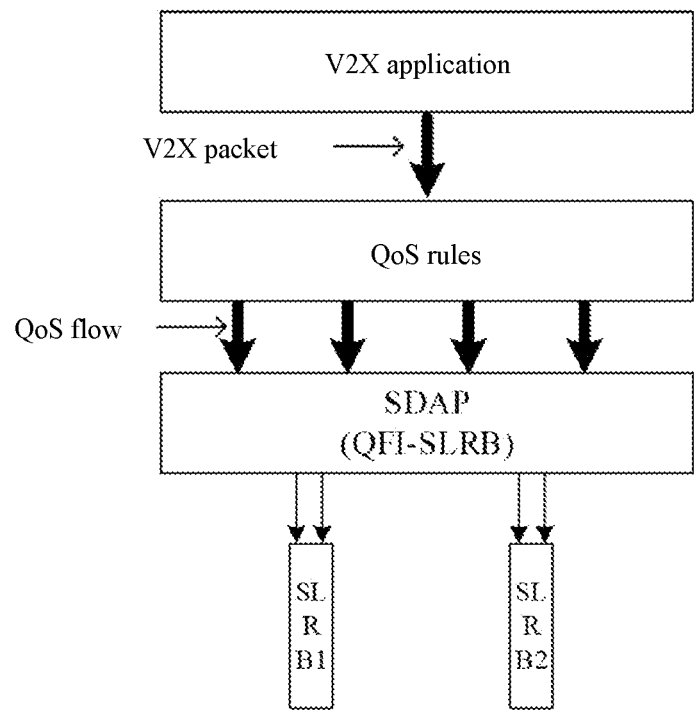
FIG. 4 is a schematic diagram of UE data mapping according to embodiment 2 of the present application.

FIG. 4 is a schematic diagram of UE data mapping according to embodiment 2 of the present application. As shown in FIG. 4, the UE maps V2X packets to QoS flows according to sidelink QoS rules (each QoS flow is associated with one QFI), finds the QoS parameter in the corresponding QoS profile according to the QFI of the QoS flow, and then establishes an SL RB according to the QoS parameter. Multiple QoS flows may be transmitted through one SL RB, and the mapping relationship between the QFI and the SL RB may be implemented by the UE. An SDAP layer is added to the sidelink and is used for mapping the QoS flow to the SL RB, and each UE has one SDAP entity. For sidelink broadcast/multicast communication, the UE independently establishes the sidelink bearer according to the arrived data packet and the QoS parameter corresponding to the data packet. This manner may also be used for sidelink unicast communication.

In addition, for the sidelink unicast communication, the UEs may negotiate to establish the sidelink bearer. In some embodiments:

A source UE sends the sidelink bearer-related configuration information to a target UE. Such configuration information includes at least one of: a bearer identifier, an SDAP configuration, a PDCP configuration, an RLC configuration, a logical channel configuration, a mirror QoS indication, or a QoS parameter. The SDAP configuration includes at least one of: NULL, a default bearer indication, a list of QoS flows (QFIs) mapped to the bearer, or whether an SDAP subheader is included. The PDCP configuration includes at least one of: a packet discarding timer, a length of a PDCP sequence number, header compression, or a reordering timer. The RLC configuration includes at least one of: a non-acknowledgement mode or an acknowledgement mode, a polling-related configuration in an acknowledgement mode, a maximum number of retransmissions in an acknowledgement mode, or whether out-of-order delivery exists. The logical channel configuration includes at least one of: a logical channel identifier, a logical channel priority, a prioritized guaranteed bit rate, bucket size duration, subcarrier spacing, an associated sidelink BWP index, or an associated carrier indication. If the SDAP configuration indicates NULL or the list of QoS flows mapped to the bearer is empty, a mapping relationship between the QoS flow and the SL RB is implemented by the sending UE itself. If the list of QoS flows mapped to the bearer is non-empty, the two UEs map the QoS flow to the SL RB according to the mapping relationship. If the list of QoS flows mapped to the bearer is non-empty and an indication of supporting mirror QoS exists, the UE SDAP entity marks a QFI corresponding to a data packet, and the peer UE may update the mapping relationship between the SL RB and the QFI (QoS flow) according to the marked QFI of the data packet and the SL RB configuration of the peer UE. The QoS parameter includes at least one of: a 5QI, an allocation retention priority, a UE-PC5-aggregate maximum bit rate (AMBR), a PC5 guaranteed flow bit rate (GFBR), a PC5 maximum flow bit rate (MFBR), a PC5 mirror QoS indication, a priority, a packet delay, a packet error rate, reliability, or a resource type.

After receiving the sidelink bearer configuration information, the target UE evaluates whether these sidelink bearer configurations can be supported and feeds back sidelink bearer configuration response information which includes a list of supported sidelink bearers, a list of unsupported sidelink bearers, reasons for not supporting, etc. The reasons for not supporting may be as follows: QoS requirements cannot be guaranteed, sidelink resources are insufficient, the sidelink resource conflict probability is high, etc.

Figure 5:
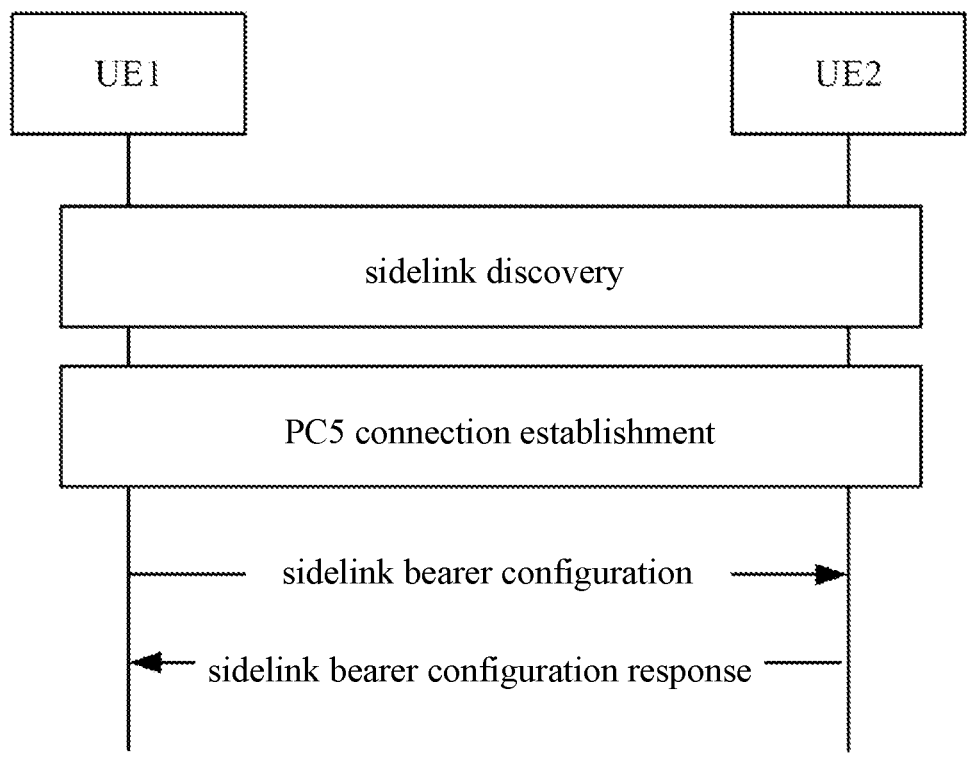
FIG. 5 is a schematic diagram of a sidelink unicast bearer configuration according to embodiment 2 of the present application.

The sidelink bearer-related configuration information and the sidelink bearer configuration response information may be separate PC5 signaling messages or carried in PC5 connection establishment and response messages. FIG. 5 is a schematic diagram of a sidelink unicast bearer configuration according to embodiment 2 of the present application.

In addition, for a UE in a connected state, the sidelink bearer may be configured by the base station for the UE. A UE NAS obtains sidelink QoS rules from the AMF and maps the V2X packet to a QoS flow. The gNB obtains QoS profiles from the AMF to configure the sidelink bearer for the UE and configure an optional mapping relationship between the SL RB and the QoS flow (QFI). The UE SDAP entity maps the QoS flow to the SL RB for transmission. Sidelink QoS rules and Uu QoS rules may be interchangeable. The sidelink bearer configuration by the gNB for the UE includes at least one of: a bearer identifier, an SDAP configuration, a PDCP configuration, an RLC configuration, a logical channel configuration, a mirror QoS indication, or a QoS parameter.

The SL RB-related configuration of the receiving UE is as follows: 1) the gNB broadcasts the SL RB-related configuration information of the sending UE (through a destination (dest) ID) through a broadcast message; 2) if the gNB knows the peer UE (connected state) of the sending UE, the gNB can configure the SL RB for the peer UE; 3) the sending UE sends the SL RB configuration to the receiving UE.

Embodiment 3: Traffic Switch

Traffic switch based on the QoS framework of embodiment 1

Traffic switch from a Uu interface to a PC5 interface is as described below.

UE1 is within coverage and sends V2X (V2V/V2I/V2N/V2P) messages through the NR air interface, and then the network sends some particular V2X messages to a UE having interest.

If a UE can obtain PC5 communication resources, part of V2V traffic can be considered to be switched to the PC5 interface for transmission when the Uu interface is congested or heavily loaded, QoS cannot be satisfied due to some traffic delay at the Uu interface, or the Uu link quality deteriorates while the PC5 interface has small load, sufficient resources, and low channel busy-idle rate.

If the UE detects that a particular peer UE originally communicating via the Uu interface has moved into a proximity service range and the peer UE is discovered through sidelink discovery, the application layer can recognize that the UE communicating via the Uu interface and discovered through the SL discovery is the same UE, and the UE establishes s PC5 connection with the peer UE. When the Uu interface is congested or heavily loaded, QoS cannot be satisfied due to some traffic delay at the Uu interface, or the Uu link quality deteriorates, part of V2V traffic is switched to the PC5 interface for transmission.

For traffic switch from the PC5 interface to the Uu interface, when a UE is detected to have been within the coverage, the UE establishes an RRC connection with the base station; if the PC5 interface is congested, has high channel busy-idle rate, or has a high resource conflict probability or the PC5 link quality deteriorates, the UE can switch the traffic at the PC5 interface to the Uu interface for transmission.

Two methods of traffic switch are described below.

1) V2X Packet-Based Switch

Figure 6:
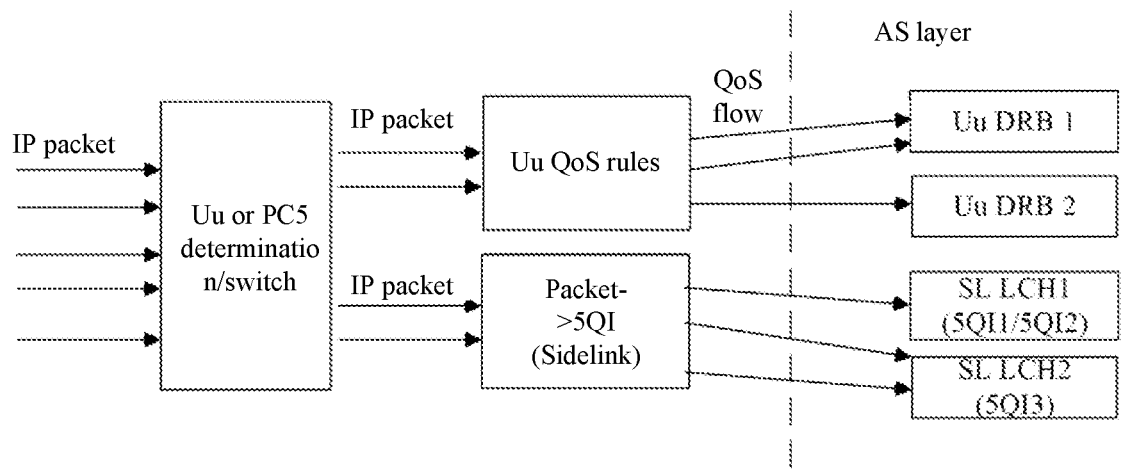
FIG. 6 is a schematic diagram of V2X data packet-based traffic switch according to embodiment 3 of the present application.

FIG. 6 is a schematic diagram of V2X data packet-based traffic switch according to embodiment 3 of the present application. As shown in FIG. 6, for the Uu interface to PC5 interface, the application layer switches, according to a traffic type, a delay, reliability, and the like, a V2V packet originally transmitted via the Uu interface to the PC5 interface for transmission, associates the packet with a 5QI, and provides the packet to the AS layer. Each SL LCH is associated with one or more 5QIs. The AS layer maps the packet to the SL LCH associated with the same 5QI. The AS layer needs to provide a load situation at the Uu interface, the Uu link quality, a state (connection/availability) of the PC5 interface, a PC5 resource utilization rate, a PC5 channel busy-idle rate, the PC5 link quality and other information.

Similarly, for the PC5 interface to the Uu interface, the UE application layer switches the packet originally transmitted via the PC5 interface to the Uu interface and maps the packet to a QoS flow through Uu QoS rules, and then the UE SDAP entity maps the QoS flow to a corresponding DRB for transmission.

2) QoS Flow-Based Switch or 5QI-Based Switch

Figure 7:
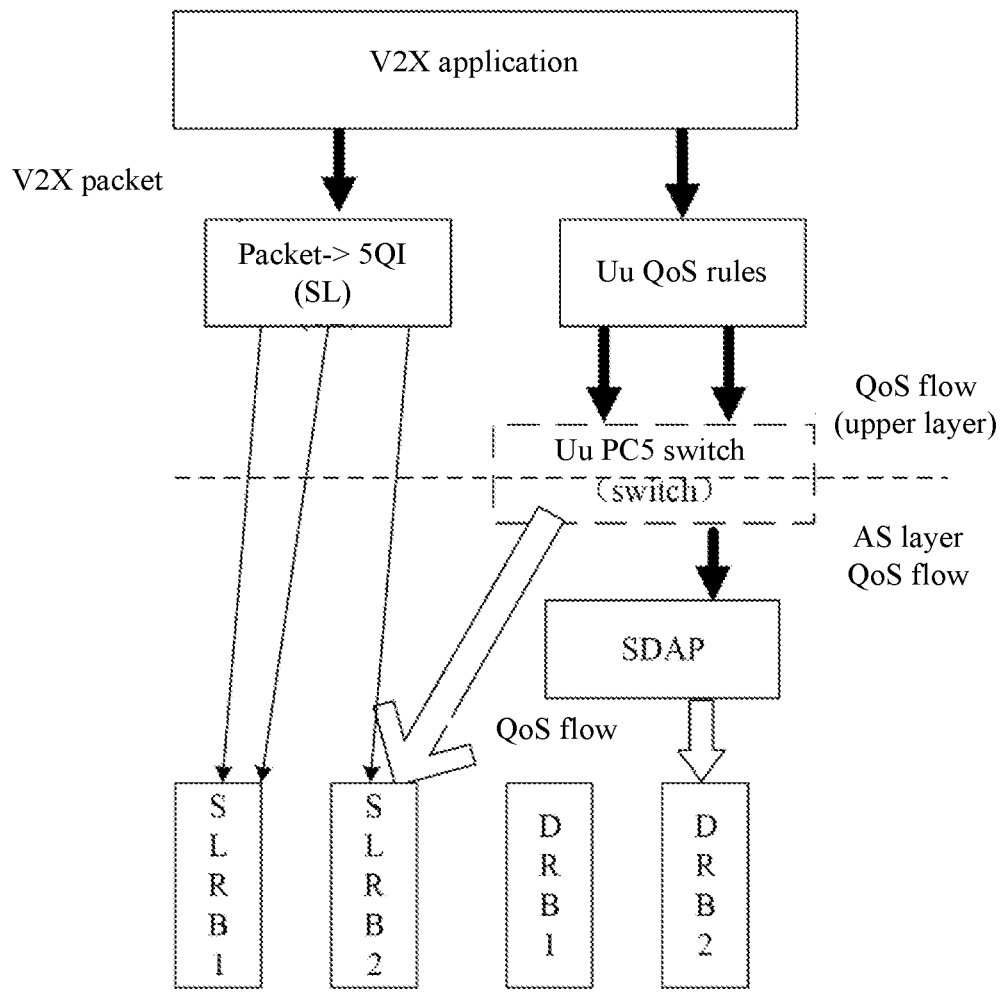
FIG. 7 is a flowchart of traffic switch from a Uu interface to a PC5 interface according to embodiment 3 of the present application.

FIG. 7 is a flowchart of traffic switch from a Uu interface to a PC5 interface according to embodiment 3 of the present application. As shown in FIG. 7, for the Uu interface to the PC5 interface, a QoS flow originally transmitted via the Uu interface (each QoS flow has a corresponding QFI and 5QI) is switched/mapped to an SL LCH (the SL LCH is associated with the 5QI). In this manner, the application layer needs to provide the traffic types corresponding to QoS flows, so as to determine which QoS flows to switch. The AS layer provides the connection states, congestion situations, resource situations, link qualities, and the like of the Uu interface and the PC5 interface. The UE combines the application layer and AS layer information to determine which QoS flow to switch to the PC5 interface.

Figure 8:
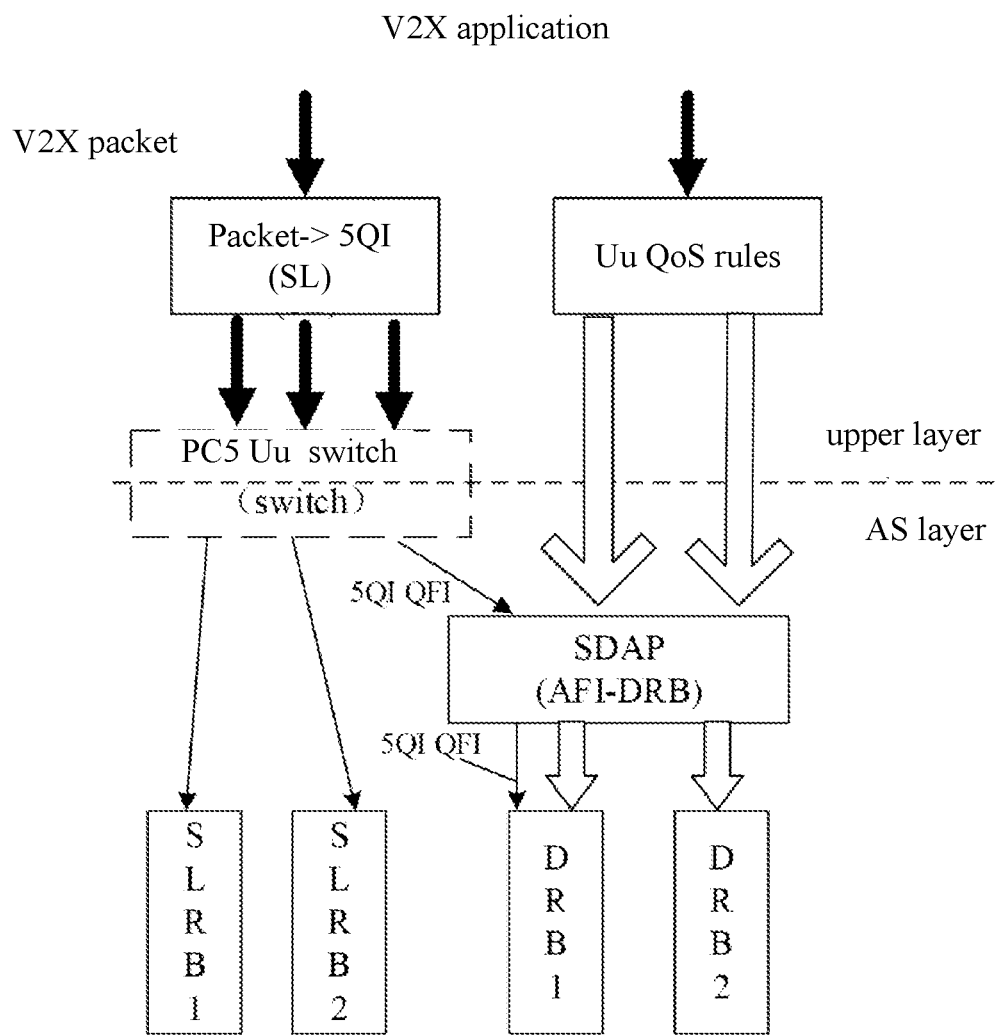
FIG. 8 is a flowchart of traffic switch from a PC5 interface to a Uu interface according to embodiment 3 of the present application.

FIG. 8 is a flowchart of traffic switch from a PC5 interface to a Uu interface according to embodiment 3 of the present application. For the PC5 interface to the Uu interface, based on a 5QI, V2X packets associated with a particular 5QI and originally transmitted via the PC5 interface are mapped to a QoS flow having the same 5QI at the Uu interface or as a new QoS flow and then mapped to a DRB for transmission according to a mapping relationship between a QoS flow and a DRB at the Uu interface. If the mapping relationship between the QoS flow and the DRB is not configured, the QoS flow is mapped to a default DRB, or a PDU session modification/request process is initiated to establish a new DRB or update the mapping relationship between the QoS flow and the DRB to transmit the QoS flow.

Embodiment 4: Traffic Switch Based on the QoS Framework of Embodiment 2 is Described Below As mentioned above, two methods for traffic switch between the Uu interface and the PC5 interface are described below.

1) Switch with a Packet as the Granularity

Figure 9:
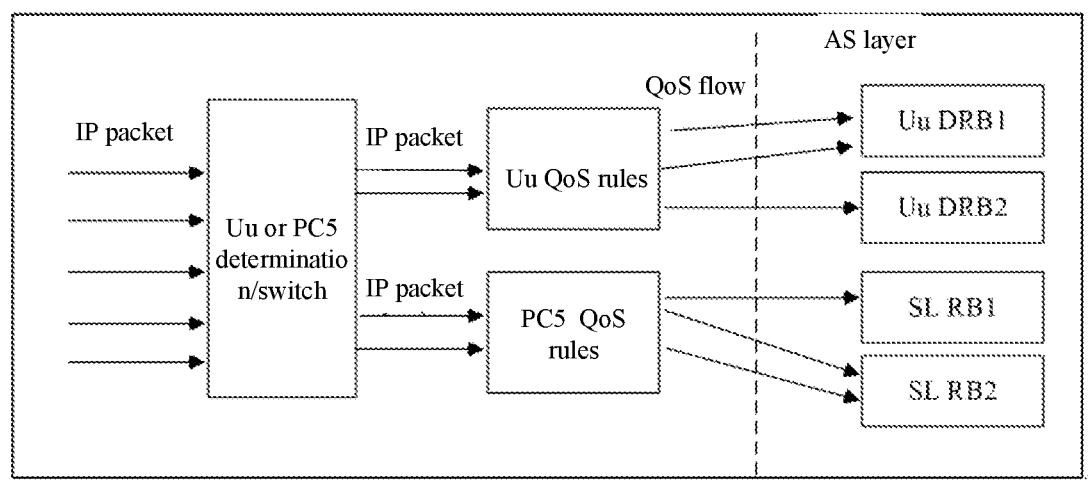
FIG. 9 is a schematic diagram of V2X data packet-based traffic switch according to embodiment 4 of the present application.

FIG. 9 is a schematic diagram of V2X data packet-based traffic switch according to embodiment 4 of the present application. As shown in FIG. 9, for traffic switch from the Uu interface to the PC5 interface, the application layer determines V2V traffic, and selects, based on traffic QoS requirements, some V2V traffic to be switched to the PC5 interface for transmission. The application layer maps a V2X packet to a QoS flow (PC5) according to PC5 QoS rules and submits the V2X packet to the AS layer (PC5). The UE SDAP entity maps the PC5 QoS flow to an SL RB for transmission, where a mapping relationship between the PC5 QoS flow and the SL RB may be implemented by the UE or configured by the gNB. The AS layer needs to provide states (RRC/PC5 connection states), congestion situations, resource usage situations, link qualities and other information of the Uu interface and the PC5 interface.

Similarly, for traffic switch from the PC5 interface to the Uu interface, the application layer switches, based on traffic QoS requirements, some traffic at the PC5 interface to the Uu interface for transmission and then maps the traffic to QoS flows (Uu) through Uu QoS rules. Conventional data routing processing is performed at the Uu interface.

2) Switch with a QoS Flow as the Granularity

Figure 10:
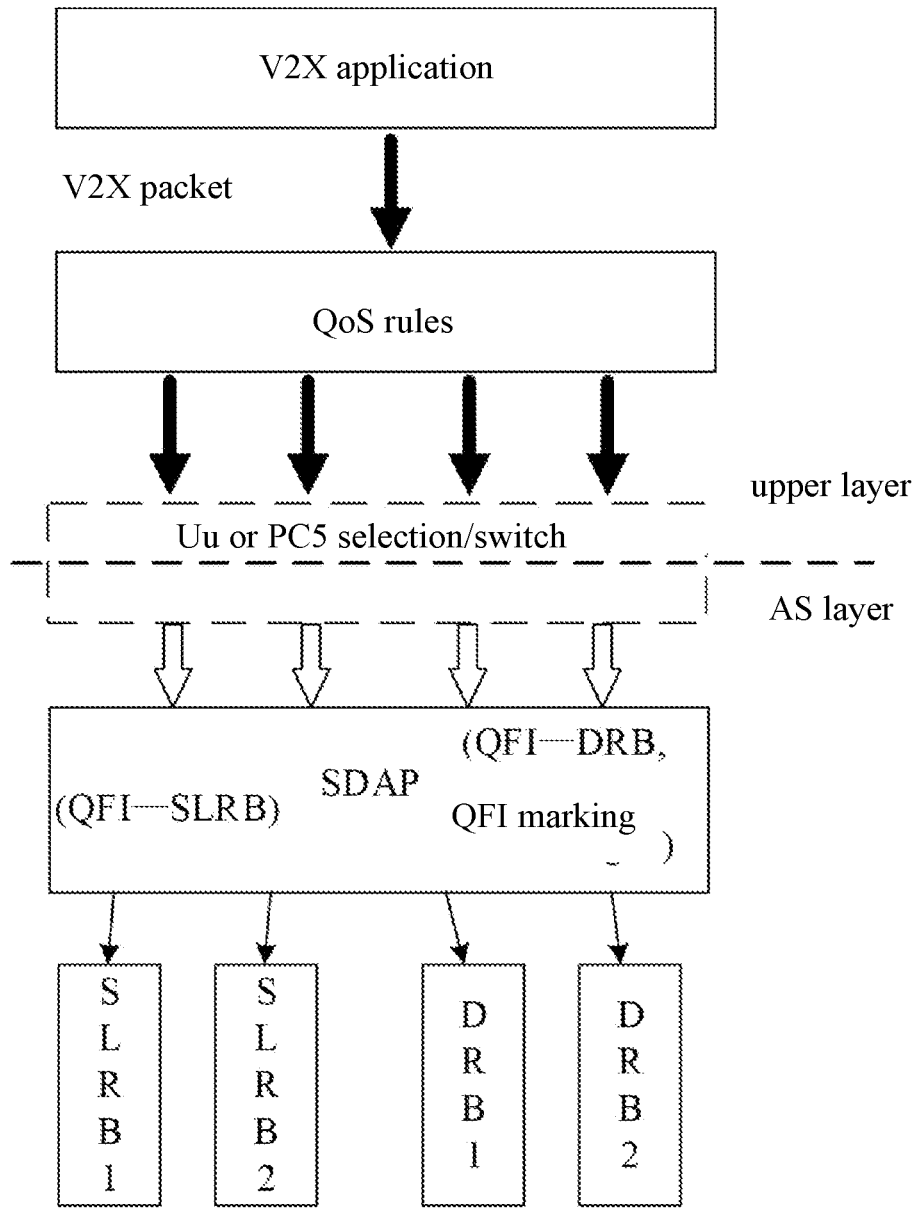
FIG. 10 is a schematic diagram of QoS flow-based traffic switch according to embodiment 4 of the present application.

FIG. 10 is a schematic diagram of QoS flow-based traffic switch according to embodiment 4 of the present application. As shown in FIG. 10, for traffic switch from the Uu interface to the PC5 interface, the UE application layer provides the traffic type and QoS requirement corresponding to a QoS flow, and the AS layer provides the state, congestion situation, resource usage situation, and link quality of the Uu interface and/or the PC5 interface, the SL RB situation at the PC5 interface and the DRB situation at the Uu interface. The UE combines the application layer information and the AS layer information to decide whether to switch some traffic from the Uu interface to the PC5 interface for transmission and which QoS flow traffic to switch. The UE upper layer indicates to the SDAP layer whether a QoS flow is transmitted via the Uu interface or the PC5 interface. The UE SDAP entity maps the QoS flow transmitted via the PC5 interface to the sidelink bearer for transmission, and the mapping relationship between the QoS flow and the SL RB may be implemented by the UE or configured by the gNB. If no suitable SL RBs are provided for some particular QoS flows switched from the Uu interface to the PC5 interface, suitable SL RBs need to be established first.

Similarly, for traffic switch from the PC5 interface to the Uu interface, the UE combines the application layer information and the AS layer information to decide whether to switch some traffic from the PC5 interface to the Uu interface for transmission and which QoS flow traffic to switch. The UE upper layer indicates to the SDAP layer whether the QoS flow is transmitted via the Uu interface or the PC5 interface. The UE SDAP entity maps the QoS flow transmitted via the Uu interface to the DRB for transmission according to the configured mapping relationship between the QoS flow and the DRB and marks the QFI for the data packet. If the mapping relationship between the QoS flow and the DRB is not configured at the Uu interface, the QoS flow is mapped to the default DRB, or a PDU session modification/request process is initiated to establish a new DRB or update the mapping relationship between the QoS flow and the DRB to transmit the QoS flow.

Embodiment 5: Traffic Switch Signaling Flow

Figure 11:
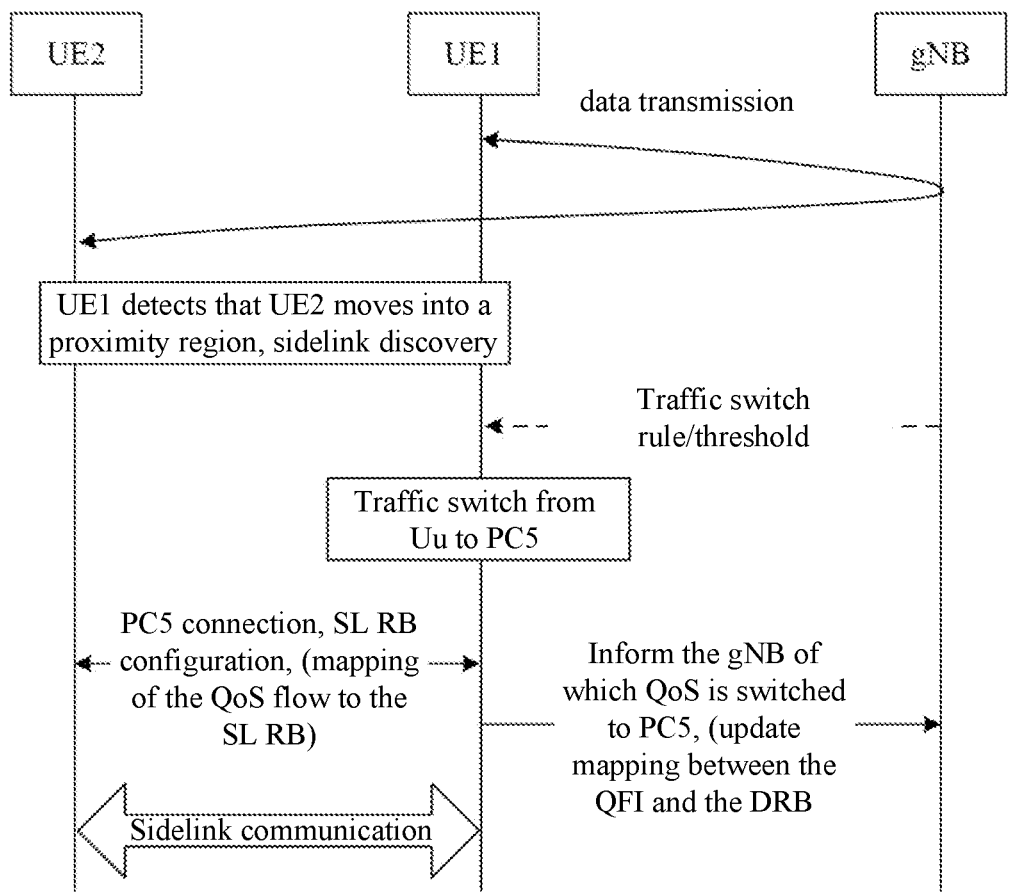
FIG. 11 is a first flowchart of traffic switch from a Uu interface to a PC5 interface according to embodiment 5 of the present application.

This embodiment uses the example of switching V2V traffic from the Uu interface to the PC5 interface for sidelink unicast communication to illustrate the traffic switch signaling flow. UE1 and UE2 originally perform V2X communication via the Uu interface. If UE1 detects that UE2 moves into a proximity service range and discovers the peer UE2 through sidelink discovery, the application layer can recognize that the UE communicating via the Uu interface and discovered through the SL discovery is the same UE. After UE1 discovers UE2 through the sidelink discovery, UE1 independently decides or the base station controls to perform traffic switch. In some embodiments:

1) UE1 independently decides to switch some particular V2V traffic at the Uu interface to the PC5 interface for transmission to relieve Uu load. In some embodiments, UE1 acquires traffic switch-related information from the base station. The traffic switch-related information includes at least one of: a Uu link quality threshold, a PC5 link quality threshold, a delay threshold, a reliability threshold, or a data rate threshold. For example, when the Uu link quality is lower than the threshold or the PC5 link quality is higher than the threshold, traffic switch may be considered; or traffic requiring a delay greater than the threshold or requiring reliability lower than the threshold may be considered to be switched to the PC5 interface for transmission. UE1 measures the Uu link quality and the PC5 link quality, establishes a PC5 connection and negotiates a bearer configuration with UE2, and independently decides (which may be with reference to a base station configuration) to switch some particular V2V traffic transmitted via the Uu interface to the PC5 interface for transmission. Two methods (packet-based switch or QoS flow-based switch) for specific traffic switch exist according to a sidelink QoS mechanism (scheme 1 of a 5QI-based QoS mechanism or scheme 2 of a QoS flow-based QoS mechanism). This embodiment uses the scheme 2 of QoS flow-based switch as an example. The UE maps the switched Uu QoS flow to the sidelink bearer for transmission and informs the gNB of QoS flows (PDU session IDs, QFIs) switched to the PC5 interface. In some embodiments, UE1 and the gNB update the mapping relationship between the QFI and the DRB. The specific flow is as shown in FIG. 11, FIG. 11 is flowchart one of traffic switch from a Uu interface to a PC5 interface according to embodiment 5 of the present application.

Figure 12:
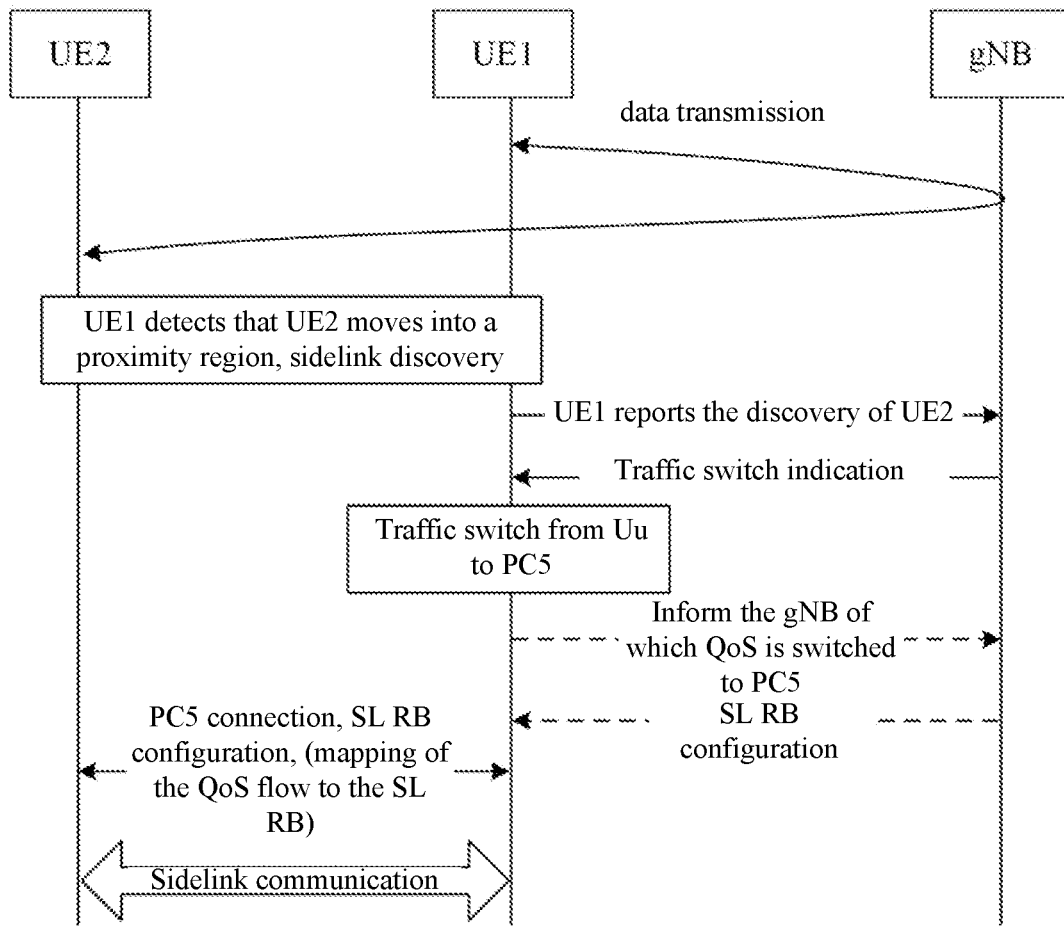
FIG. 12 is a second flowchart of traffic switch from a Uu interface to a PC5 interface according to embodiment 5 of the present application.

2) Traffic switch controlled by the base station. In some embodiments, after UE1 discovers UE2 through the sidelink discovery, UE1 reports the discovery of UE2 and the PC5 link quality to the gNB, and the base station delivers a traffic switch indication. UE1 performs traffic switch from the Uu interface to the PC5 interface, and UE1 combines the application layer information and the access layer information to determine which QoS flows (QFIs) at the Uu interface are switched to the PC5 interface (Uu QFI->SL RB). In some embodiments, UE1 reports to the gNB which QoS flows (PDU session IDs, QFIs) to switch, and the eNB configures the sidelink bearer for the UE1 according to the QoS parameters of these QoS flows. UE1 establishes a PC5 connection with UE2, sends a sidelink bearer configuration to UE2, and maps the switched Uu QoS flow to the SL RB for transmission. The flow is as shown in FIG. 12. FIG. 12 is flowchart two of traffic switch from a Uu interface to a PC5 interface according to embodiment 5 of the present application.

Figure 13:
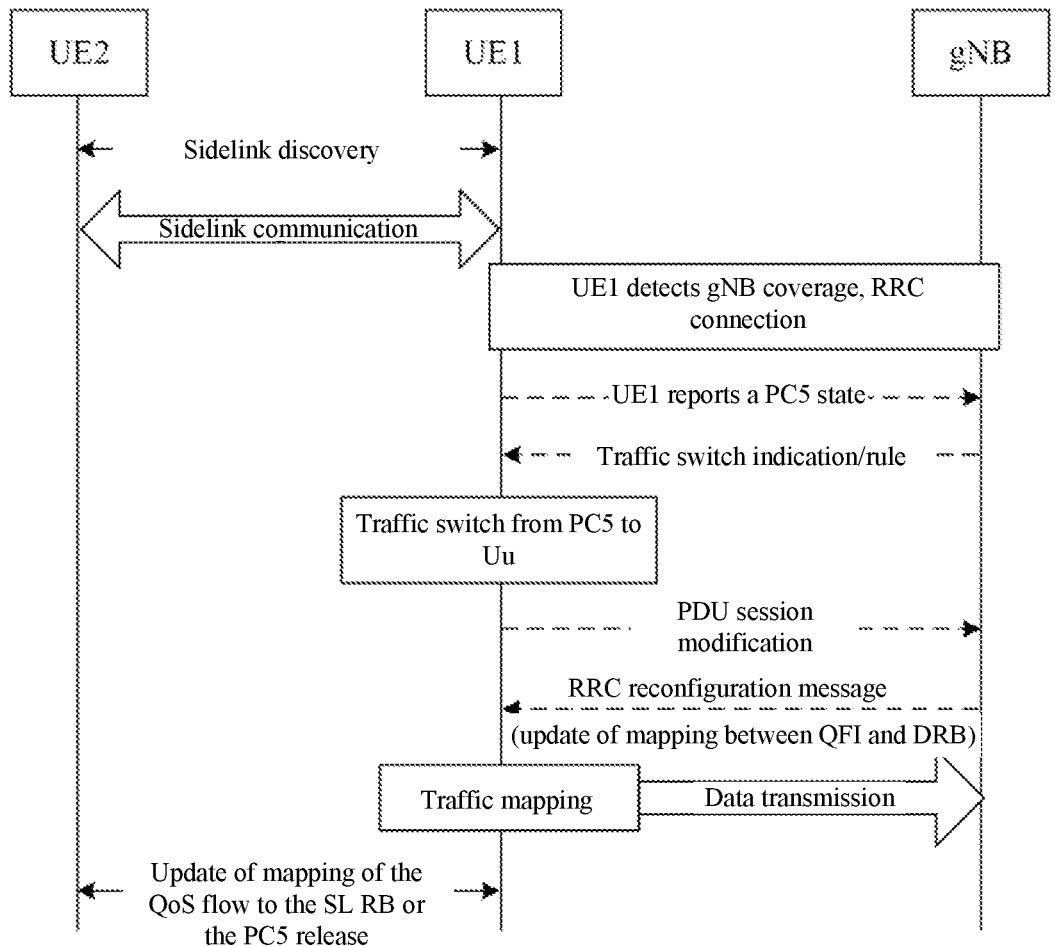
FIG. 13 is a flowchart of traffic switch from a PC5 interface to a Uu interface according to embodiment 5 of the present application.

This embodiment uses the example of switching V2V traffic from the PC5 interface for sidelink unicast communication to the Uu interface for transmission to illustrate the traffic switch signaling flow. After UE1 discovers UE2 through the sidelink discovery, UE1 and UE2 establish a PC5 connection, negotiate a sidelink bearer, and then perform sidelink communication. After a period of time, UE1 detects network coverage and establishes an RRC connection with the gNB. After UE1 is in the RRC connected state, UE1 can independently decide whether and when to switch V2V traffic at the PC5 interface to the Uu interface for transmission. In some embodiments, UE1 reports to the gNB state information of the PC5 interface, such as the PC5 link quality, the PC5 congestion situation, the PC5 channel busy-idle rate, the PC5 resource conflict situation, the PC5 bearer and corresponding QoS parameter information, and the mapping relationship between the PC5 bearer and the PC5 QoS flow. The traffic switch indication information delivered by the base station includes at least one of: a traffic switch indication, a Uu link quality threshold, a PC5 link quality threshold, a delay threshold, a reliability threshold, information about a switched PC5 QoS flow (QFI), or a mapping relationship between a switched PC5 QoS flow and the DRB. UE1 switches the PC5 QoS flow to the Uu interface for transmission according to an independent decision by UE1 or according to the gNB configuration information. If the gNB does not configure the mapping relationship between the switched PC5 QoS flow (or the same QFI) and the DRB or no suitable DRB exists, UE1 initiates a PDU session modification/request message to update the mapping relationship between the DRB and the QoS flow or to create a new DRB and configure the mapped QoS flow. In some embodiments, UE1 and UE2 update the mapping relationship between the PC5 QoS flow and the SL RB or release the PC5 connection. The flow is as shown in FIG. 13. FIG. 13 is a flowchart of traffic switch from a PC5 interface to a Uu interface according to embodiment 5 of the present application.

From the description of the foregoing embodiment, it will be apparent to those skilled in the art that the method in the foregoing embodiment may be implemented by software plus a necessary general-purpose hardware platform or may of course be implemented by hardware. However, in many cases, the former is a preferred implementation. Based on such an understanding, the solutions of the present application substantially, or the part contributing to the existing art, may be embodied in the form of a software product. The computer software product is stored on a storage medium (such as a ROM/RAM, a magnetic disk, or an optical disk) and includes one or more instructions to enable a terminal device (which may be a mobile phone, a computer, a server, or a network device) to perform the method according to embodiments of the present application.

Embodiment Two

This embodiment further provides a data transmission apparatus and a traffic switch apparatus. The apparatuses are configured to implement the foregoing embodiments and preferred embodiments. What has been described will not be repeated. As used below, the term "module" may be software, hardware, or a combination thereof capable of implementing predetermined functions. The apparatuses in this embodiment described below are preferably implemented by software, but an implementation by hardware or by a combination of software and hardware is also possible and conceivable.

A data transmission apparatus is provided according to an embodiment of the present application. The apparatus includes a first acquisition module, a first configuration module, and a first mapping module.

The first acquisition module is configured to acquire first information of quality of service (QoS) of a to-be-transmitted data packet on a sidelink.

The first configuration module is configured to configure a sidelink bearer.

The first mapping module is configured to map, according to the first information, the to-be-transmitted data packet to the sidelink bearer for transmission to a second terminal.

With the foregoing solution, sidelink traffic transmission is performed according to the first information related to QoS. A solution of sidelink bearer mapping suitable for the new radio is provided, solving the problem in the related art of lacking a solution of determining a sidelink bearer suitable for the new radio.

The technical solution regarding the sidelink bearer in the present application may be applied to a logical channel.

In some embodiments, the foregoing steps may, but may not necessarily, be executed by a mobile terminal such as a vehicle.

In some embodiments, the first information includes at least one of: second information including a fifth-generation mobile system quality of service identifier (5QI) and/or a transmission range corresponding to the to-be-transmitted data packet; third information including at least one of the following information corresponding to the to-be-transmitted data packet: a priority, reliability, a transmission delay, a data rate, a packet error rate, or a transmission range; fourth information including sidelink QoS rules; or fifth information including a sidelink QoS profile.

In some embodiments, when the first information is the second information or the third information, the step in which the first terminal acquires the first information of the quality of service (QoS) on the sidelink includes that the first terminal acquires the second information or the third information from a V2X application layer.

In some embodiments, when the first information is the fourth information and/or the fifth information, the step in which the first terminal acquires the first information of the quality of service (QoS) on the sidelink includes one of the following: the first terminal acquires the fourth information and/or the fifth information from a V2X control function entity; the first terminal acquires the fourth information and/or the fifth information from preconfigured information; or the first terminal acquires the fourth information from an access and mobility management function entity at the network side.

The fourth information includes at least one of: a 5QI, a guaranteed flow bit rate (GFBR), a maximum flow bit rate (MFBR), or an averaging window.

In some embodiments, the sidelink QoS rules are the same as or different from the Uu QoS rules of the first terminal.

In some embodiments, the step of configuring the sidelink bearer includes one of the following: the first terminal independently configures the sidelink bearer according to the fourth information and/or the fifth information; or the first terminal sends sidelink bearer configuration information to the second terminal, receives sidelink bearer configuration response information fed back by the second terminal, and configures the sidelink bearer according to the sidelink bearer configuration response information.

In some embodiments, the sidelink bearer configuration information includes at least one of: a bearer identifier, an SDAP configuration, a PDCP configuration, an RLC configuration, a logical channel configuration, a mirror QoS indication, or a QoS parameter. The QoS parameter includes multiple information: the 5QI, the GFBR, the MFBR, and the averaging window.

In some embodiments, the method satisfies at least one of the features described below.

The SDAP configuration includes at least one of: NULL, a default bearer indication, a list of QoS flows mapped to the bearer, or whether an SDAP subheader is included.

The PDCP configuration includes at least one of: a packet discarding timer, a length of a PDCP sequence number, header compression, or a reordering timer.

The RLC configuration includes at least one of: a non-acknowledgement mode or an acknowledgement mode, a polling-related configuration in an acknowledgement mode, a maximum number of retransmissions in an acknowledgement mode, or whether out-of-order delivery is supported.

The logical channel configuration includes at least one of: a logical channel identifier, a logical channel priority, a prioritized guaranteed bit rate, bucket size duration, subcarrier spacing, an associated sidelink bandwidth part (BWP) index, or an associated carrier indication.

The QoS parameter includes at least one of: a 5QI, an allocation retention priority, a UE-PC5-aggregate maximum bit rate (AMBR), a PC5 guaranteed flow bit rate (GFBR), a PC5 maximum flow bit rate (MFBR), a PC5 mirror QoS indication, a priority, a packet delay, a packet error rate, reliability, or a resource type.

In some embodiments, the sidelink bearer configuration response information includes at least one of: a list of sidelink bearers supported by the second terminal or a list of sidelink bearers not supported by the second terminal. The reason why the sidelink bearers are not supported by the second terminal may also be included.

In some embodiments, the step of configuring the sidelink bearer includes that: the first terminal receives sidelink bearer configuration information sent by a base station; and the sidelink bearer is configured according to the sidelink bearer configuration information.

In some embodiments, the step of mapping, according to the first information, the to-be-transmitted data packet to the sidelink bearer for the transmission includes one of the following: in response to the first information being the second information, mapping a to-be-transmitted data packet associated with a first 5QI to a sidelink bearer associated with the first 5QI for the transmission; or in response to the first information being the fourth information, mapping, according to the sidelink rules and the sidelink bearer configuration information, the to-be-transmitted data packet to a corresponding sidelink bearer for the transmission.

In some embodiments, the step of mapping, according to the sidelink rules, the to-be-transmitted data packet to the corresponding sidelink bearer for the transmission includes that: the first terminal maps the to-be-transmitted data packet to a QoS flow according to the sidelink rules; and a sidelink SDAP entity of the first terminal maps the QoS flow to the sidelink bearer for the transmission.

In some embodiments, the method includes that: in the first terminal, the sidelink SDAP entity is the same as or different from a Uu SDAP entity.

In some embodiments, the step in which the sidelink SDAP entity of the first terminal maps the QoS flow to the sidelink bearer for the transmission includes the cases described below.

In a case where SDAP configuration information in the sidelink bearer configuration information indicates NULL or a list of QoS flows mapped to the sidelink bearer is empty, the first terminal determines a rule of mapping between the QoS flow and the sidelink bearer.

In a case where the SDAP configuration information in the sidelink bearer configuration information indicates that the list of QoS flows mapped to the sidelink bearer is non-empty, the first terminal maps, according to a mapping relationship of the non-empty list, the QoS flow to the sidelink bearer for the transmission.

In a case where the SDAP configuration information in the sidelink bearer configuration information indicates that the list of QoS flows mapped to the sidelink bearer is non-empty and an indication of supporting mirror QoS exists, the SDAP entity of the first terminal marks a QoS flow identifier (QFI) corresponding to a data packet of the QoS flow.

In some embodiments, the QFI and the QoS flow are configured for providing a basis for a peer UE to update a first mapping relationship which is a mapping relationship between a QFI and a sidelink bearer stored by the peer UE.

In some embodiments, after mapping, according to the first information, the to-be-transmitted data packet to the sidelink bearer for the transmission to the second terminal, the method further includes: the first terminal acquiring traffic switch information; and performing traffic switch according to the traffic switch information, where the traffic switch is configured for switching the to-be-transmitted data packet between a Uu interface and a PC5 interface.

In some embodiments, the traffic switch information includes at least one of: application layer information, access layer information, or traffic switch indication information configured by a base station.

In some embodiments, the method satisfies at least one of the features described below.

The application layer information includes at least one of: a data packet traffic type, a QoS flow traffic type, or QoS demand information. The QoS demand information includes at least one of: a priority, a delay, reliability, a transmission rate, a data rate, or a transmission range.

The access layer information includes at least one of: Uu link quality, Uu reference signal received power, a Uu bearer and QoS parameter, a Uu congestion degree, PC5 link quality, a PC5 connection establishment state, a PC5 channel busy-idle rate, a PC5 discovery signal received power, a PC5 synchronization signal received power, a PC5 resource conflict probability, a PC5 congestion situation, a PC5 bearer, or a QoS parameter.

The traffic switch indication information configured by the base station includes at least one of: a traffic switch indication, a Uu link quality threshold, a PC5 link quality threshold, a delay threshold, a reliability threshold, a data rate threshold, a traffic type, an application type, a QoS flow identifier (QFI) of a switched PC5 QoS flow, a mapping relationship between a switched PC5 QoS flow and a DRB, information about a switched Uu QoS flow, or a mapping relationship between a switched Uu QoS flow and a sidelink bearer.

In some embodiments, information about a Uu QoS flow includes a PDU session identifier and a QFI.

In some embodiments, the step of performing the traffic switch according to the traffic switch information includes one of the steps described below.

In a case where an application layer of the first terminal determines that a fourth data packet is transmitted via the Uu interface, the first terminal maps the fourth data packet to a fourth QoS flow through Uu QoS rules, and an SDAP entity of the first terminal maps the fourth QoS flow to a DRB for transmission.

In a case where an application layer of the first terminal determines that a fifth data packet is transmitted via the PC5 interface, the application layer of the first terminal configures a fifth 5QI corresponding to the fifth data packet, and the first terminal maps the fifth data packet to a sidelink bearer associated with the fifth 5QI.

The first terminal switches and maps a QoS flow of a fourth QFI transmitted via the Uu interface to a sidelink bearer associated with a same 5QI or the fourth QFI in the PC5 interface.

The first terminal acquires a sixth data packet associated with a sixth 5QI at the PC5 interface and maps the sixth data packet to a sixth QoS flow of the sixth 5QI in the Uu interface or to a newly established seventh QoS flow; and an SDAP entity of the first terminal maps the sixth QoS flow or the seventh QoS flow to a DRB.

In a case where the first terminal determines, according to the traffic switch information, that a seventh data packet is transmitted at the PC5 interface, the first terminal maps the seventh data packet to a PC5 QoS flow through PC5 QoS rules, and an SDAP entity of the first terminal maps the PC5 QoS flow to a sidelink bearer for transmission.

After the first terminal maps a data packet to an eighth QoS flow according to QoS rules, in response to determining that the eighth QoS flow is transmitted via the Uu interface, eighth information of a transmission path is indicated to an SDAP entity of the first terminal, and the SDAP entity of the first terminal maps, according to the eighth information, the eighth QoS flow to a DRB for transmission.

After the first terminal maps a data packet to a ninth QoS flow according to QoS rules, in response to determining that the ninth QoS flow is transmitted via the PC5 interface, ninth information of a transmission path is indicated to an SDAP entity of the first terminal, and the SDAP entity of the first terminal maps, according to the ninth information, the ninth QoS flow to a sidelink bearer for transmission.

In some embodiments, after performing the traffic switch according to the traffic switch information, the method further includes at least one of the following: the first terminal sends first notification information to a base station, and the base station updates the mapping relationship between a DRB and a QFI according to the first notification information; or the first terminal sends a second notification message to the second terminal, where the second terminal updates a mapping relationship between a sidelink bearer and a QFI or releases a PC5 connection with the first terminal according to the second notification message.

A traffic switch apparatus is further provided according to another embodiment of the present application. The apparatus includes a second acquisition module and a second switch module.

The second acquisition module is configured to enable a first terminal to acquire traffic switch information.

The second switch module is configured to perform traffic switch according to the traffic switch information, where the traffic switch is configured for switching a to-be-transmitted data packet between a Uu interface and a PC5 interface.

With the foregoing solution, the first terminal acquires the traffic switch information and the switch is performed according to the traffic switch information. A manner of traffic switch between the Uu interface and the PC5 interface suitable for the new radio is provided, solving the problem in the related art of lacking a solution of traffic switch between the Uu interface and the PC5 interface suitable for the new radio.

In some embodiments, the traffic switch information includes at least one of: application layer information, access layer information, or traffic switch indication information configured by a base station.

In some embodiments, the method satisfies at least one of the features described below.

The application layer information includes at least one of: a data packet traffic type, a QoS flow traffic type, or QoS demand information. The QoS demand information includes at least one of: a priority, a delay, reliability, a transmission rate, a data rate, or a transmission range.

The access layer information includes at least one of: Uu link quality, Uu reference signal received power, a Uu bearer and QoS parameter, a Uu congestion degree, PC5 link quality, a PC5 connection establishment state, a PC5 channel busy-idle rate, a PC5 discovery signal received power, a PC5 synchronization signal received power, a PC5 resource conflict probability, a PC5 congestion situation, a PC5 bearer, or a QoS parameter.

The traffic switch indication information configured by the base station includes at least one of: a traffic switch indication, a Uu link quality threshold, a PC5 link quality threshold, a delay threshold, a reliability threshold, a data rate threshold, a traffic type, an application type, a QoS flow identifier (QFI) of a switched PC5 QoS flow, a mapping relationship between a switched PC5 QoS flow and a DRB, information about a switched Uu QoS flow, or a mapping relationship between a switched Uu QoS flow and a sidelink bearer.

Information about a Uu QoS flow includes a PDU session identifier and a QFI.

In some embodiments, the step of performing the traffic switch according to the traffic switch information includes one of the steps described below.

The first terminal independently decides, according to the traffic switch information, to perform the traffic switch.

The first terminal acquires traffic switch indication information sent by the base station, and performs the traffic switch according to the traffic switch indication information.

In some embodiments, the step of performing the traffic switch according to the traffic switch information includes one of the steps described below.

Traffic switch for each data packet is performed according to the traffic switch information.

Traffic switch for each QoS flow is performed according to the traffic switch information.

In some embodiments, the step of performing the traffic switch according to the traffic switch information includes one of the steps described below.

In a case where an application layer of the first terminal determines that a fourth data packet is transmitted via the Uu interface, the first terminal maps the fourth data packet to a fourth QoS flow through Uu QoS rules, and an SDAP entity of the first terminal maps the fourth QoS flow to a DRB for transmission.

In a case where an application layer of the first terminal determines that a fifth data packet is transmitted via the PC5 interface, the application layer of the first terminal configures a fifth 5QI corresponding to the fifth data packet, and the first terminal maps the fifth data packet to a sidelink bearer associated with the fifth 5QI.

The first terminal switches and maps a QoS flow of a fourth QFI transmitted via the Uu interface to a sidelink bearer associated with a same 5QI or the fourth QFI in the PC5 interface.

The first terminal acquires a sixth data packet associated with a sixth 5QI at the PC5 interface and maps the sixth data packet to a sixth QoS flow of the sixth 5QI in the Uu interface or to a newly established seventh QoS flow; and an SDAP entity of the first terminal maps the sixth QoS flow or the seventh QoS flow to a DRB.

In a case where the first terminal determines, according to the traffic switch information, that a seventh data packet is transmitted at the PC5 interface, the first terminal maps the seventh data packet to a PC5 QoS flow through PC5 QoS rules, and an SDAP entity of the first terminal maps the PC5 QoS flow to a sidelink bearer for transmission.

After the first terminal maps a data packet to an eighth QoS flow according to QoS rules, in response to determining that the eighth QoS flow is transmitted via the Uu interface, eighth information of a transmission path is indicated to an SDAP entity of the first terminal, and the SDAP entity of the first terminal maps, according to the eighth information, the eighth QoS flow to a DRB for transmission.

After the first terminal maps a data packet to a ninth QoS flow according to QoS rules, in response to determining that the ninth QoS flow is transmitted via the PC5 interface, ninth information of a transmission path is indicated to an SDAP entity of the first terminal, and the SDAP entity of the first terminal maps, according to the ninth information, the ninth QoS flow to a sidelink bearer for transmission.

In some embodiments, when the first terminal determines, according to the traffic switch information, to transmit data at the Uu interface, the to-be-transmitted data packet is mapped to a QoS flow according to QoS rules, and the SDAP entity of the first terminal maps the QoS flow to a data radio bearer (DRB) for transmission.

In some embodiments, the step in which the SDAP entity of the first terminal maps the sixth QoS flow, the seventh QoS flow, or the eighth QoS flow to the DRB includes one of the steps described below.

The SDAP entity of the first terminal maps, according to a mapping relationship between a QoS flow and a DRB in a sidelink bearer configuration, the sixth QoS flow, the seventh QoS flow, or the eighth QoS flow to the DRB for transmission.

In response to not configuring a mapping relationship between a QoS flow and a DRB, the SDAP entity of the first terminal maps the sixth QoS flow, the seventh QoS flow, or the eighth QoS flow to a default DRB for transmission.

In response to not configuring a mapping relationship between a QoS flow and a DRB, the first terminal initiates a session request to establish a new session and configures the mapping relationship between the QoS flow and the DRB, or the first terminal initiates a session request to modify a current session and configures the mapping relationship between the QoS flow and the DRB.

In some embodiments, before the SDAP entity of the first terminal maps the PC5 QoS flow to the sidelink bearer for the transmission, the method further includes that the first terminal acquires a second mapping relationship between the PC5 QoS flow and the sidelink bearer in one of the manners described below.

The first terminal independently determines the second mapping relationship.

The second mapping relationship configured by a base station is received.

The first terminal and a peer terminal determine the second mapping relationship through negotiation.

Mirror mapping is performed according to a third mapping relationship between a sidelink bearer and a PC5 QoS flow of a peer terminal to acquire the second mapping relationship.

In some embodiments, after performing the traffic switch according to the traffic switch information, the method further includes at least one of the following steps:

the first terminal sends first notification information to a base station for indicating that a tenth QoS flow transmitted at the Uu interface is switched to the PC5 interface, and the base station updates a mapping relationship between a DRB and a QFI according to the first notification information, that is, the first notification information may indicate which QoS flows in the Uu interface have been switched; and the base station configures the sidelink bearer for the first terminal according to the QoS parameter of the QoS flow in the indicated first notification information; or the first terminal sends a second notification message to the second terminal, where the second terminal updates a mapping relationship between a sidelink bearer and a QFI or releases a PC5 connection with the first terminal according to the second notification message.

In some embodiments, the first notification message is used to indicate that the tenth QoS flow transmitted at the Uu interface is switched to the PC5 interface.

In some embodiments, after the first terminal sends the first notification information to the base station, the first terminal receives the sidelink bearer configuration configured by the base station for the first terminal according to the QoS parameter of the tenth QoS flow.

It is to be noted that each module described above may be implemented by software or hardware. Implementation by hardware may, but may not necessarily, be performed in the following manners: the various modules described above are located in the same processor, or each module described above is located in their respective processors in any combination form.

Embodiment Three

A storage medium is further provided in this embodiment of the present application. In some embodiments, in this embodiment, the storage medium may be configured to store program codes for executing steps described below.

S1: in step S302, a first terminal acquires first information of quality of service (QoS) of a to-be-transmitted data packet on a sidelink.

S2: in step S304, a sidelink bearer is configured.

S3: in step S306, the to-be-transmitted data packet is mapped to the sidelink bearer according to the first information for transmission to a second terminal.

In some embodiments, the storage medium is further configured to store program codes for executing the steps described below.

In some embodiments, in this embodiment, the storage medium may include, but is not limited to, a USB flash disk, a read-only memory (ROM), a random access memory (RAM), a mobile hard disk, a magnetic disk, an optical disk or another medium capable of storing program codes.

An electronic apparatus is further provided in the embodiments of the present application and includes a memory and a processor. The memory stores a computer program, and the processor is configured to execute the computer program to perform the steps in any one of the foregoing method embodiments.

In some embodiments, the electronic apparatus may further include a transmission apparatus and an input and output device. The transmission apparatus is connected to the processor. The input and output device is connected to the processor.

In some embodiments, in this embodiment, the foregoing processor may be configured to execute the steps below through a computer program.

S1: in step S302, a first terminal acquires first information of quality of service (QoS) of a to-be-transmitted data packet on a sidelink.

S2: in step S304, a sidelink bearer is configured.

S3: in step S306, the to-be-transmitted data packet is mapped to the sidelink bearer according to the first information for transmission to a second terminal.

In some embodiments, for examples in this embodiment, reference may be made to the examples described in the foregoing embodiments and optional embodiments. Repetition will not be made in this embodiment.

In some embodiments, for examples in this embodiment, reference may be made to the examples described in the foregoing embodiments and optional embodiments. Repetition will not be made in this embodiment.

Apparently, it is to be understood by those skilled in the art that various modules or steps described above in the present application may be implemented by a general-purpose computing apparatus, the various modules or steps may be concentrated on a single computing apparatus or distributed on a network composed of multiple computing apparatuses. In some embodiments, the various modules or steps may be implemented by program codes executable by the computing apparatus, so that the modules or steps may be stored in a storage apparatus for execution by the computing apparatus, and in some particular circumstances, the illustrated or described steps may be performed in sequences different from those described herein, or the module or steps may be made into various integrated circuit modules separately, or multiple modules or steps therein may be made into a single integrated circuit module for implementation. In this manner, the present application is not limited to any particular combination of hardware and software.

What is claimed is:

1. A data transmission method, comprising:
   acquiring, by a first terminal, first information of quality of service (QOS) of a to- be-transmitted data packet on a sidelink;
   establishing, by the first terminal, a sidelink bearer; and
   mapping, by the first terminal and according to the first information, the to-be-transmitted data packet to the sidelink bearer for transmission to a second terminal;
   wherein the first information comprises second information and fourth information, wherein the second information comprises a fifth-generation mobile system quality of service identifier (5QI) and a transmission range corresponding to the to-be- transmitted data packet, and the fourth information comprises sidelink QoS rules;
   wherein establishing the sidelink bearer comprises: receiving, by the first terminal from a base station, sidelink bearer configuration information; and establishing, by the first terminal, the sidelink bearer according to the sidelink bearer configuration information, wherein the sidelink bearer configuration information comprises a bearer identifier and a service data adaptation protocol (SDAP) configuration which comprises a list of QoS flows mapped to the sidelink bearer;
   wherein mapping, by the first terminal according to the first information, the to-be-transmitted data packet to the sidelink bearer for the transmission comprises: mapping, by the first terminal and according to the sidelink QoS rules and the sidelink bearer configuration information, the to-be-transmitted data packet to the sidelink bearer for the transmission.

2. The method of claim 1, wherein the first information further comprises third information comprising at least one of following information corresponding to the to-be-transmitted data packet: reliability, a transmission delay, a data rate, a packet error rate, or a transmission range.

3. The method of claim 1, wherein the sidelink bearer configuration information further comprises at least one of:
   a packet data convergence protocol (PDCP) configuration, a radio link control (RLC) configuration, a logical channel configuration, a mirror QoS indication, or a QoS parameter.

4. The method of claim 3, wherein the method satisfies at least one of:
   the PDCP configuration comprising at least one of: a packet discarding timer, a length of a PDCP sequence number, header compression, or a reordering timer;
   the RLC configuration comprising at least one of: a non-acknowledgement mode or an acknowledgement mode, a polling-related configuration in an acknowledgement mode, a maximum number of retransmissions in an acknowledgement mode, or whether out-of-order delivery is supported;
   the logical channel configuration comprising at least one of: a logical channel identifier, a logical channel priority, a prioritized guaranteed bit rate, bucket size duration, subcarrier spacing, an associated sidelink bandwidth part (BWP) index, or an associated carrier indication; or
   the QoS parameter comprising at least one of: a 5QI, an allocation retention priority, a user equipment (UE)-PC5-aggregate maximum bit rate (AMBR), a PC5 guaranteed flow bit rate (GFBR), a PC5 maximum flow bit rate (MFBR), a PC5 mirror QoS indication, a priority, a packet delay, a packet error rate, reliability, or a resource type.

5. The method of claim 1, wherein mapping, by the first terminal and according to the sidelink QoS rules, the to-be-transmitted data packet to the corresponding sidelink bearer for the transmission comprises:
   mapping, by the first terminal, the to-be-transmitted data packet to a QoS flow according to the sidelink QoS rules; and
   mapping, by a sidelink SDAP entity of the first terminal, the QoS flow to the sidelink bearer for the transmission.

6. The method of claim 5, wherein mapping, by the sidelink SDAP entity of the first terminal, the QoS flow to the sidelink bearer for the transmission comprises:
   in a case where SDAP configuration information in the sidelink bearer configuration information indicates NULL or a list of QoS flows mapped to the sidelink bearer is empty, determining, by the first terminal, a rule of mapping between the QoS flow and the sidelink bearer;
   in a case where the SDAP configuration information in the sidelink bearer configuration information indicates that the list of QoS flows mapped to the sidelink bearer is non-empty, mapping, by the first terminal according to a mapping relationship of the non-empty list, the QoS flow to the sidelink bearer for the transmission; and in a case where the SDAP configuration information in the sidelink bearer configuration information indicates that the list of QoS flows mapped to the sidelink bearer is non-empty and an indication of supporting mirror QoS exists, marking, by the sidelink SDAP entity of the first terminal, a QoS flow identifier (QFI) corresponding to a data packet of the QoS flow.

7. The method of claim 6, wherein the QFI is configured for providing a basis for a peer UE to update a first mapping relationship which is a mapping relationship between a QFI and a sidelink bearer stored by the peer UE.

8. The method of claim 1, wherein after mapping, according to the first information, the to-be-transmitted data packet to the sidelink bearer for the transmission to the second terminal, the method further comprises:

acquiring, by the first terminal, traffic switch information; and performing traffic switch according to the traffic switch information, wherein the traffic switch is configured for switching the to-be-transmitted data packet between a PC5 interface and a Uu interface of a UE.

9. The method of claim 8, wherein the traffic switch information comprises at least one of:

application layer information, access layer information, or traffic switch indication information configured by a base station.

10. The method of claim 9, wherein the method satisfies at least one of:

the application layer information comprising at least one of: a data packet traffic type, a QoS flow traffic type, or QoS demand information;

the access layer information comprising at least one of: Uu link quality, Uu reference signal received power, a Uu bearer and QoS parameter, a Uu congestion degree, PC5 link quality, a PC5 connection establishment state, a PC5 channel busy-idle rate, a PC5 discovery signal received power, a PC5 synchronization signal received power, a PC5 resource conflict probability, a PC5 congestion situation, a PC5 bearer, or a QoS parameter; or the traffic switch indication information configured by the base station comprising at least one of: a traffic switch indication, a Uu link quality threshold, a PC5 link quality threshold, a delay threshold, a reliability threshold, a data rate threshold, a traffic type, an application type, a QFI of a switched PC5 QoS flow, a mapping relationship between a switched PC5 QoS flow and a data radio bearer (DRB), information about a switched Uu QoS flow, or a mapping relationship between a switched Uu QoS flow and the sidelink bearer.

11. The method of claim 8, wherein performing the traffic switch according to the traffic switch information comprises one of:

in a case where an application layer of the first terminal determines that a fourth data packet is transmitted via the Uu interface, mapping, by the first terminal, the fourth data packet to a fourth QoS flow through Uu QoS rules, and mapping, by a Uu SDAP entity of the first terminal, the fourth QoS flow to a DRB for transmission;

in a case where an application layer of the first terminal determines that a fifth data packet is transmitted via the PC5 interface, configuring, by the application layer of the first terminal, a fifth 5QI corresponding to the fifth data packet, and mapping, by the first terminal, the fifth data packet to a sidelink bearer associated with the fifth 5QI for transmission;

switching and mapping, by the first terminal, a QoS flow of a fourth QFI transmitted via the Uu interface to a sidelink bearer associated with the fourth QFI in the PC5 interface;

acquiring, by the first terminal, a sixth data packet associated with a sixth 5QI at the PC5 interface, and mapping the sixth data packet to a sixth QoS flow of the sixth 5QI in the Uu interface or to a newly established seventh QoS flow; and mapping, by an a Uu SDAP entity of the first terminal, the sixth QoS flow or the seventh QoS flow to a DRB;

in a case where the first terminal determines, according to the traffic switch information, that a seventh data packet is transmitted at the PC5 interface, mapping, by the first terminal, the seventh data packet to a PC5 QoS flow through PC5 QoS rules, and mapping, by an a sidelink SDAP entity of the first terminal, the PC5 QoS flow to a sidelink bearer for transmission;

after the first terminal maps a data packet to an eighth QoS flow according to QoS rules, in response to determining to transmit the eighth QoS flow via the Uu interface, indicating eighth information of a transmission path to a Uu SDAP entity of the first terminal, and mapping, by the Uu SDAP entity of the first terminal according to the eighth information, the eighth QoS flow to a DRB for transmission; or after the first terminal maps a data packet to a ninth QoS flow according to QoS rules, in response to determining to transmit the ninth QoS flow via the PC5 interface, indicating ninth information of a transmission path to a sidelink SDAP entity of the first terminal, and mapping, by the sidelink SDAP entity of the first terminal according to the ninth information, the ninth QoS flow to a sidelink bearer for transmission.

12. The method of claim 8, wherein after performing the traffic switch according to the traffic switch information, the method further comprises at least one of:

sending, by the first terminal, first notification information to the base station, and updating, by the base station, the mapping relationship between a DRB and a QFI according to the first notification information; or sending, by the first terminal, a second notification message to the second terminal, wherein the second terminal updates a mapping relationship between a sidelink bearer and a QFI or releases a PC5 connection with the first terminal according to the second notification message.

13. A non-transitory computer-readable storage medium storing a computer program, wherein the computer program is configured to, when executed, perform the method of claim 1.

14. An electronic apparatus, comprising a memory and a processor, wherein the memory is configured to store a computer program, and the processor is configured to execute the computer program to perform the method of claim 1.

* * * * *